US010142759B2

(12) United States Patent
Ugur et al.

(10) Patent No.: US 10,142,759 B2
(45) Date of Patent: Nov. 27, 2018

(54) METHOD AND APPARATUS FOR PROCESSING AUDIO WITH DETERMINED TRAJECTORY

(71) Applicant: Nokia Technologies Oy, Espoo (FI)

(72) Inventors: Kemal Ugur, Tampere (FI); Mikko Tapio Tammi, Tampere (FI)

(73) Assignee: Nokia Technologies Oy, Espoo (FI)

( * ) Notice: Subject to any disclaimer, the term of this patent is extended or adjusted under 35 U.S.C. 154(b) by 137 days.

(21) Appl. No.: 14/326,465

(22) Filed: Jul. 9, 2014

(65) Prior Publication Data

US 2015/0016641 A1 Jan. 15, 2015

(51) Int. Cl.
*H04S 7/00* (2006.01)
*G10L 21/0216* (2013.01)
*G10L 21/0272* (2013.01)
*H04R 1/40* (2006.01)
*G06K 9/32* (2006.01)

(52) U.S. Cl.
CPC .......... *H04S 7/303* (2013.01); *G10L 21/0216* (2013.01); *G10L 21/0272* (2013.01); *H04R 1/406* (2013.01); *G06K 2009/3291* (2013.01); *G10L 2021/02166* (2013.01); *H04R 2430/20* (2013.01); *H04R 2499/11* (2013.01)

(58) Field of Classification Search
CPC H04R 1/406; H04R 2430/20; H04R 2499/11; H04S 7/303; G06K 2009/3291; G10L 21/0216; G10L 21/0272; G10L 2021/02166
See application file for complete search history.

(56) References Cited

U.S. PATENT DOCUMENTS

| | | | |
|---|---|---|---|
| 2005/0111674 A1 | 5/2005 | Hsu | |
| 2007/0016426 A1 | 1/2007 | Hershey et al. | |
| 2008/0174665 A1 | 7/2008 | Enstad et al. | |
| 2008/0243278 A1* | 10/2008 | Dalton | H04S 7/304 700/94 |
| 2008/0259731 A1 | 10/2008 | Happonen | |

(Continued)

FOREIGN PATENT DOCUMENTS

| | | | | |
|---|---|---|---|---|
| DE | WO 2011160850 A1 * | 12/2011 | ............... | H04S 7/30 |
| JP | 11-331827 A | 11/1999 | | |

(Continued)

OTHER PUBLICATIONS

English machine translation of JP 2009-296232 (Takizawa et al., Sound Input Unit, Sound Input Method and Program, published Dec. 2009).*

(Continued)

*Primary Examiner* — Mark Fischer
(74) *Attorney, Agent, or Firm* — Harrington & Smith

(57) ABSTRACT

An apparatus comprising: a spatial audio analyzer configured to determine, using at least one audio signal, at least one acoustic source; a location determiner configured to determining at least one point of interest location associated with the at least one acoustic source; a trajectory determiner configured to determine a trajectory of the at least one point of interest location associated with the at least one acoustic source; and a processor configured to reproduce the at least one audio signal from at least one sound playback transducer based on the determined trajectory.

26 Claims, 10 Drawing Sheets

(56) References Cited

U.S. PATENT DOCUMENTS

| | | |
|---|---|---|
| 2009/0116652 A1 | 5/2009 | Kirkeby et al. |
| 2009/0154896 A1 | 6/2009 | Matono |
| 2009/0190040 A1* | 7/2009 | Watanabe ............ H04N 5/765 348/725 |
| 2010/0026780 A1 | 2/2010 | Tico et al. |
| 2010/0123785 A1 | 5/2010 | Chen et al. |
| 2010/0128892 A1* | 5/2010 | Chen ............... H04R 3/005 381/92 |
| 2010/0185308 A1 | 7/2010 | Yoshida et al. ............ 700/94 |
| 2010/0254543 A1 | 10/2010 | Kjolerbakken |
| 2011/0069643 A1 | 3/2011 | Yoakum et al. |
| 2011/0164141 A1 | 7/2011 | Tico et al. |
| 2012/0128174 A1 | 5/2012 | Tammi et al. |
| 2012/0155703 A1 | 6/2012 | Hernandez et al. |
| 2012/0209132 A1 | 8/2012 | Jones et al. |
| 2013/0044884 A1 | 2/2013 | Tammi et al. |
| 2013/0114819 A1* | 5/2013 | Melchior ............... H04S 7/30 381/59 |
| 2013/0342731 A1* | 12/2013 | Lee ............... H04N 5/23293 348/231.4 |

FOREIGN PATENT DOCUMENTS

| | | |
|---|---|---|
| JP | 2004-147205 A | 5/2004 |
| JP | 2007-300220 A | 11/2007 |
| JP | 2008-271157 A | 11/2008 |
| JP | 2009-296232 A | 12/2009 |
| JP | 2010-187363 A | 8/2010 |
| JP | 2010-273062 A | 12/2010 |
| JP | 2012-169783 A | 9/2012 |
| JP | 2013-240000 A | 11/2013 |
| WO | 2008122974 A1 | 10/2008 |
| WO | 2011/020067 A1 | 2/2011 |
| WO | 2011/076286 A1 | 6/2011 |
| WO | 2013/093565 A1 | 6/2013 |

OTHER PUBLICATIONS

Extended European Search Report received for corresponding European Patent Application No. 14175510.8, dated Feb. 10, 2015, 8 pages.

Schmidt, "Multiple Emitter Location and Signal Parameter Estimation", IEEE Transactions on Antennas and Propagation, vol. 34, Issue: 3, Mar. 1986, pp. 276-280.

Li et al., "Study of Locating and Tracking Method for Sound Source", 3rd International Conference on Genetic and Evolutionary Computing, Oct. 14-17, 2009, pp. 741-745.

Tsuji et al., "A Moving Sound Source Tracking Based on Two Successive Algirthms", IEEE International Symposium on Circuits and Systems, May 24-27, 2009, pp. 2577-2580.

Chetverikov et al., "Tracking Feature Points: A new Algorithm", Proceedings of the Fourteenth International Conference on Pattern Recognition, vol. 2, Aug. 16-20, 1998, 3 pages.

Shi et al., "Good Feature to Track", IEEE Computer Society Conference on Computer Vision and Pattern Recognition, Jun. 21-23, 1994, 8 pages.

Kim et al., "Efficient Sound Source Localization Method Using Region Selection", IEEE International Symposium on Industrial Electronics, Jul. 5-8, 2009, pp. 1029-1034.

"Distributed Audio Systems", Viscenter, Retrieved on Sep. 25, 2014, Webpage available at: http://vis.uky.edu/research/audio-systems/.

GB Search Report received for priority Application No. GB1312326.0 dated Dec. 4, 2013, 4 pages.

Office action received for corresponding Japanese Patent Application No. 2014-141411, dated Jun. 2, 2015, 4 pages of office action and 7 pages of office action translation available.

\* cited by examiner

METHOD AND APPARATUS FOR PROCESSING AUDIO WITH DETERMINED TRAJECTORY

FIELD

The present application relates to apparatus for audio processing. The application further relates to, but is not limited to, portable or mobile apparatus for audio processing.

BACKGROUND

Audio and audio-video recording on electronic apparatus is now common. Devices ranging from professional video capture equipment, consumer grade camcorders and digital cameras to mobile phones and even simple devices as webcams can be used for electronic acquisition of motion video images. Recording video and the audio associated with video has become a standard feature on many mobile devices and the technical quality of such equipment has rapidly improved. Recording personal experiences using a mobile device is quickly becoming an increasingly important use for mobile devices such as mobile phones and other user equipment. Combining this with the emergence of social media and new ways to efficiently share content underlies the importance of these developments and the new opportunities offered for the electronic device industry.

In conventional situations the environment comprises sound fields with audio sources spread in all three spatial dimensions. The human hearing system controlled by the brain has evolved the innate ability to localize, isolate and comprehend these sources in the three dimensional sound field. For example the brain attempts to localize audio sources by decoding the cues that are embedded in the audio wavefronts from the audio source when the audio wavefront reaches our binaural ears. The two most important cues responsible for spatial perception is the interaural time differences (ITD) and the interaural level differences (ILD). For example an audio source located to the left and front of the listener takes more time to reach the right ear when compared to the left ear. This difference in time is called the ITD. Similarly, because of head shadowing, the wavefront reaching the right ear gets attenuated more than the wavefront reaching the left ear, leading to ILD. In addition, transformation of the wavefront due to pinna structure, shoulder reflections can also play an important role in how we localize the sources in the 3D sound field. These cues therefore are dependent on person/listener, frequency, location of audio source in the 3D sound field and environment he/she is in (for example the whether the listener is located in an anechoic chamber/auditorium/living room).

Audio-video recordings are well known in implementation. Often recording or capture is carried out in environmentally noisy situations where background noise causes difficulty in understanding detail that has been recorded. This typically results in requests to repeat the recording to determine the detail. This is particularly acute in recording conversation where it can be difficult to follow the discussion due to local noise causing serve distraction. Even where the surrounding or environmental noise does not prevent the user from understanding the detail in the recording it can still be very distracting and annoying and requiring extra effort in listening.

SUMMARY OF THE APPLICATION

Aspects of this application thus provide an audio processing capability to enable more flexible audio processing.

There is provided an apparatus comprising at least one processor and at least one memory including computer code for one or more programs, the at least one memory and the computer code configured to with the at least one processor cause the apparatus to: determine, using at least one audio signal, at least one acoustic source; determine at least one point of interest location associated with the at least one acoustic source; determine a trajectory of the at least one point of interest location associated with the at least one acoustic source; and reproduce the at least one audio signal from at least one sound playback transducer based on the determined trajectory.

Determining, using at least one audio signal, at least one acoustic source may cause the apparatus to perform at least one of: determine at least one metafile associated with the at least one audio signal, the metafile comprising acoustic source location information; and determine from the acoustic source location information at least one acoustic source and wherein determining at least one point of interest location associated with the at least one acoustic source causes the apparatus to determine at least one point of interest location associated with the at least one acoustic source based on the acoustic source location information.

Determining at least one point of interest location associated with the at least one acoustic source may cause the apparatus to perform at least one of: determine at least one point of interest location associated with the at least one acoustic source by determining at least one location associated with a visual image element from an image frame; determine at least one point of interest location associated with the at least one acoustic source by determining at least one location associated with at least one audio signal; and determine at least one point of interest location associated with the at least one acoustic source by determining at least one user input location.

The apparatus may be further caused to: provide at least one visual image element, within a region of a display, of the at least one acoustic source; and determine at least one point of interest location associated with the at least one visual element, wherein determining at least one point of interest location associated with the at least one acoustic source causes the apparatus to determine the at least one point of interest location associated with the at least one acoustic source as the at least one point of interest location associated with the at least one visual element.

Providing at least one visual image element, within a region of a display, of the at least one acoustic source may further cause the apparatus to: generate a display image comprising at least one visual image element from an image frame within a region of the display; display the display image on a touch interface display configured to provide at least one selection input, wherein determine a point of interest location of the at least one visual element causes the apparatus to determine the one point of interest location based on the at least one selection input.

Generating the display image may cause the apparatus to: capture at least one image frame; generate at least one user interface overlay element; and combine the at least one image frame and the at least one user interface overlay element to generate the display image comprising the at least one visual element.

Generating at least one user interface overlay element may cause the apparatus to perform at least one of: generate an overlay displaying the point of interest location of the at least one acoustic source; generate an overlay highlighting the at least one point of interest location associated with the at least one acoustic source is out of field of view of the image frame; generate a focus region overlay displaying a processing focus range and direction based on the at least one point of interest location associated with the at least one acoustic source; generate a processing overlay configured to display the toggle state for generating at least one further at least one user interface overlay element; generate a focus amplification overlay configured to display at least one amplification gain for reproducing the at least one audio signal from at least one sound playback transducer based on the determined trajectory; generate a focus attenuation overlay configured to display at least one attenuation dampening for reproducing the at least one audio signal from at least one sound playback transducer based on the determined trajectory; generate a focus inverter overlay configured to display a toggle state for inverting a focus operation; and generate a focus amplification profile overlay configured to display an amplification profile for directions surrounding the apparatus.

The apparatus may be further caused to provide at least one control input associated with the at least one point of interest location associated with the at least one acoustic source and wherein reproducing the at least one audio signal from at least one sound playback transducer based on the determined trajectory causes the apparatus to reproduce the at least one audio signal based on the at least one control input.

Providing at least one control input associated with the at least one location may cause the apparatus to provide at least one of: a processing width for controlling the reproducing the at least one audio signal from at least one sound playback transducer; a processing range for controlling the reproducing the at least one audio signal from at least one sound playback transducer; a focus amplification factor for controlling reproducing the at least one audio signal from at least one sound playback transducer; a focus attenuation factor for controlling the reproducing the at least one audio signal from at least one sound playback transducer; an out of focus amplification factor for controlling the reproducing the at least one audio signal from at least one sound playback transducer; and an out of focus attenuation for controlling the reproducing the at least one audio signal from at least one sound playback transducer.

The at least one audio signal may comprise at least two audio signals and determining, using at least one audio signal, at least one acoustic source may cause the apparatus to perform at least one of: determine from at least two audio signals at least one acoustic source comprising a location value; and determine at least one acoustic source from the at least one acoustic source within the at least one point of interest location associated with the at least one acoustic source.

Determining a trajectory of the at least one point of interest location associated with the at least one acoustic source may cause the apparatus to: determine at least at least one feature associated with at least one visual image element and/or the at least one acoustic source at the at least one point of interest location; track the at least one feature associated with the at least one visual image element and/or the at least one acoustic source respectively; and determine the trajectory of the at least one feature.

The apparatus may be further caused to receive the at least one audio signal from at least one of: at least two microphones; an apparatus memory; and at least one further apparatus.

The apparatus may be further caused to: receive at least one captured image frame from which the at least one location is determined, wherein the at least one captured image frame is received from at least one of: at least one camera; a memory; and at least one further apparatus.

According to a second aspect there is provided an apparatus comprising: means for determining, using at least one audio signal, at least one acoustic source; means for determining at least one point of interest location associated with the at least one acoustic source; means for determining a trajectory of the at least one point of interest location associated with the at least one acoustic source; and means for reproducing the at least one audio signal from at least one sound playback transducer based on the determined trajectory.

The means for determining, using at least one audio signal, at least one acoustic source may comprise at least one of: means for determining at least one metafile associated with the at least one audio signal, the metafile comprising acoustic source location information; and means for determining from the acoustic source location information at least one acoustic source and wherein the means for determining at least one point of interest location associated with the at least one acoustic source may comprise means for determining at least one point of interest location associated with the at least one acoustic source based on the acoustic source location information.

The means for determining at least one point of interest location associated with the at least one acoustic source may comprise at least one of: means for determining at least one point of interest location associated with the at least one acoustic source by determining at least one location associated with a visual image element from an image frame; means for determining at least one point of interest location associated with the at least one acoustic source by determining at least one location associated with at least one audio signal; and means for determining at least one point of interest location associated with the at least one acoustic source by determining at least one user input location.

The apparatus may further comprise: means for providing at least one visual image element, within a region of a display, of the at least one acoustic source; and means for determining at least one point of interest location associated with the at least one visual element, wherein the means for determining at least one point of interest location associated with the at least one acoustic source may comprise means for determining the at least one point of interest location associated with the at least one acoustic source as the at least one point of interest location associated with the at least one visual element.

The means for providing at least one visual image element, within a region of a display, of the at least one acoustic source may further comprise: means for generating a display image comprising at least one visual image element from an image frame within a region of the display; means for displaying the display image on a touch interface display configured to provide at least one selection input, wherein the means for determining a point of interest location of the at least one visual element may comprise means for determining the one point of interest location based on the at least one selection input.

The means for generating the display image may comprise: means for capturing at least one image frame; means for generating at least one user interface overlay element; and means for combining the at least one image frame and the at least one user interface overlay element to generate the display image comprising the at least one visual element.

The means for generating at least one user interface overlay element may comprise at least one of: means for generating an overlay displaying the point of interest location of the at least one acoustic source; means for generating an overlay highlighting the at least one point of interest location associated with the at least one acoustic source is out of field of view of the image frame; means for generating a focus region overlay displaying a processing focus range and direction based on the at least one point of interest location associated with the at least one acoustic source; means for generating a processing overlay configured to display the toggle state for generating at least one further at least one user interface overlay element; means for generating a focus amplification overlay configured to display at least one amplification gain for reproducing the at least one audio signal from at least one sound playback transducer based on the determined trajectory, means for generating a focus attenuation overlay configured to display at least one attenuation dampening for reproducing the at least one audio signal from at least one sound playback transducer based on the determined trajectory; means for generating a focus inverter overlay configured to display a toggle state for inverting a focus operation; and means for generating a focus amplification profile overlay configured to display an amplification profile for directions surrounding the apparatus.

The apparatus may comprise means for providing at least one control input associated with the at least one point of interest location associated with the at least one acoustic source and wherein the means for reproducing the at least one audio signal from at least one sound playback transducer based on the determined trajectory may comprise means for reproducing the at least one audio signal based on the at least one control input.

The means for providing at least one control input associated with the at least one location may comprise at least one of: means for providing a processing width for controlling the reproducing the at least one audio signal from at least one sound playback transducer; means for providing a processing range for controlling the reproducing the at least one audio signal from at least one sound playback transducer; means for providing a focus amplification factor for controlling reproducing the at least one audio signal from at least one sound playback transducer; means for providing a focus attenuation factor for controlling the reproducing the at least one audio signal from at least one sound playback transducer; means for providing an out of focus amplification factor for controlling the reproducing the at least one audio signal from at least one sound playback transducer; and means for providing an out of focus attenuation for controlling the reproducing the at least one audio signal from at least one sound playback transducer.

The at least one audio signal may comprise at least two audio signals and the means for determining, using at least one audio signal, at least one acoustic source may comprise at least one of: means for determining from at least two audio signals at least one acoustic source comprising a location value; and means for determining at least one acoustic source from the at least one acoustic source within the at least one point of interest location associated with the at least one acoustic source.

The means for determining a trajectory of the at least one point of interest location associated with the at least one acoustic source may comprise: means for determining at least at least one feature associated with at least one visual image element and/or the at least one acoustic source at the at least one point of interest location; means for tracking the at least one feature associated with the at least one visual image element and/or the at least one acoustic source respectively; and means for determining the trajectory of the at least one feature.

The apparatus may further comprise means for receiving the at least one audio signal from at least one of: at least two microphones; an apparatus memory; and at least one further apparatus.

The apparatus may further comprise: means for receiving at least one captured image frame from which the at least one location is determined, wherein the at least one captured image frame may be received from at least one of: at least one camera; a memory; and at least one further apparatus.

According to a third aspect there is provided a method comprising: determining, using at least one audio signal, at least one acoustic source; determining at least one point of interest location associated with the at least one acoustic source; determining a trajectory of the at least one point of interest location associated with the at least one acoustic source; and reproducing the at least one audio signal from at least one sound playback transducer based on the determined trajectory.

Determining, using at least one audio signal, at least one acoustic source may comprise at least one of: determining at least one metafile associated with the at least one audio signal, the metafile comprising acoustic source location information; and determining from the acoustic source location information at least one acoustic source and wherein determining at least one point of interest location associated with the at least one acoustic source comprises determining at least one point of interest location associated with the at least one acoustic source based on the acoustic source location information.

Determining at least one point of interest location associated with the at least one acoustic source may comprise at least one of: determining at least one point of interest location associated with the at least one acoustic source by determining at least one location associated with a visual image element from an image frame; determining at least one point of interest location associated with the at least one acoustic source by determining at least one location associated with at least one audio signal; and determining at least one point of interest location associated with the at least one acoustic source by determining at least one user input location.

The method may further comprise: providing at least one visual image element, within a region of a display, of the at least one acoustic source; and determining at least one point of interest location associated with the at least one visual element, wherein determining at least one point of interest location associated with the at least one acoustic source may comprise determining the at least one point of interest location associated with the at least one acoustic source as the at least one point of interest location associated with the at least one visual element.

Providing at least one visual image element, within a region of a display, of the at least one acoustic source may further comprise: generating a display image comprising at least one visual image element from an image frame within a region of the display; displaying the display image on a touch interface display configured to provide at least one selection input, wherein determining a point of interest location of the at least one visual element may comprise determining the one point of interest location based on the at least one selection input.

Generating the display image may comprise: capturing at least one image frame; generating at least one user interface overlay element; and combining the at least one image frame and the at least one user interface overlay element to generate the display image comprising the at least one visual element.

Generating at least one user interface overlay element may comprise at least one of: generating an overlay displaying the point of interest location of the at least one acoustic source; generating an overlay highlighting the at least one point of interest location associated with the at least one acoustic source is out of field of view of the image frame; generating a focus region overlay displaying a processing focus range and direction based on the at least one point of interest location associated with the at least one acoustic source; generating a processing overlay configured to display the toggle state for generating at least one further at least one user interface overlay element; generating a focus amplification overlay configured to display at least one amplification gain for reproducing the at least one audio signal from at least one sound playback transducer based on the determined trajectory, generating a focus attenuation overlay configured to display at least one attenuation dampening for reproducing the at least one audio signal from at least one sound playback transducer based on the determined trajectory; generating a focus inverter overlay configured to display a toggle state for inverting a focus operation; and generating a focus amplification profile overlay configured to display an amplification profile for directions surrounding the apparatus.

The method may comprise providing at least one control input associated with the at least one point of interest location associated with the at least one acoustic source and wherein reproducing the at least one audio signal from at least one sound playback transducer based on the determined trajectory may comprise reproducing the at least one audio signal based on the at least one control input.

Providing at least one control input associated with the at least one location may comprise at least one of: providing a processing width for controlling the reproducing the at least one audio signal from at least one sound playback transducer; providing a processing range for controlling the reproducing the at least one audio signal from at least one sound playback transducer; providing a focus amplification factor for controlling reproducing the at least one audio signal from at least one sound playback transducer; providing a focus attenuation factor for controlling the reproducing the at least one audio signal from at least one sound playback transducer; providing an out of focus amplification factor for controlling the reproducing the at least one audio signal from at least one sound playback transducer; and providing an out of focus attenuation for controlling the reproducing the at least one audio signal from at least one sound playback transducer.

The at least one audio signal may comprise at least two audio signals and determining, using at least one audio signal, at least one acoustic source may comprise at least one of: determining from at least two audio signals at least one acoustic source comprising a location value; and determining at least one acoustic source from the at least one acoustic source within the at least one point of interest location associated with the at least one acoustic source.

Determining a trajectory of the at least one point of interest location associated with the at least one acoustic source may comprise: determining at least at least one feature associated with at least one visual image element and/or the at least one acoustic source at the at least one point of interest location; tracking the at least one feature associated with the at least one visual image element and/or the at least one acoustic source respectively; and determining the trajectory of the at least one feature.

The method may further comprise receiving the at least one audio signal from at least one of: at least two microphones; an apparatus memory, and at least one further apparatus.

The method may further comprise: receiving at least one captured image frame from which the at least one location is determined, wherein the at least one captured image frame may be received from at least one of: at least one camera; a memory; and at least one further apparatus.

According to a fourth aspect there is provided an apparatus comprising: a spatial audio analyser configured to determine, using at least one audio signal, at least one acoustic source; a location determiner configured to determining at least one point of interest location associated with the at least one acoustic source; a trajectory determiner configured to determine a trajectory of the at least one point of interest location associated with the at least one acoustic source; and a processor configured to reproduce the at least one audio signal from at least one sound playback transducer based on the determined trajectory.

The spatial audio analyser may comprise at least one of: a metafile determiner configured to determine at least one metafile associated with the at least one audio signal, the metafile comprising acoustic source location information; and a spatial analyser configured to determine from the acoustic source location information at least one acoustic source and wherein the location determiner may be configured to determine at least one point of interest location associated with the at least one acoustic source based on the acoustic source location information.

The location determiner may comprise at least one of: an image location determiner configured to determine at least one point of interest location associated with the at least one acoustic source by determining at least one location associated with a visual image element from an image frame; an audio location determiner configured to determine at least one point of interest location associated with the at least one acoustic source by determining at least one location associated with at least one audio signal; and a user interface input configured to determine at least one point of interest location associated with the at least one acoustic source by determining at least one user input location.

The apparatus may further comprise: a visual processor configured to provide at least one visual image element, within a region of a display, of the at least one acoustic source; and a touch controller configured to determine at least one point of interest location associated with the at least one visual element, wherein the location determiner may be configured to determine the at least one point of interest location associated with the at least one acoustic source as the at least one point of interest location associated with the at least one visual element.

The visual processor may be configured to: generate a display image comprising at least one visual image element from an image frame within a region of the display; display the display image on a touch interface display configured to provide at least one selection input, wherein the location determiner may be configured to determine the at least one point of interest location based on the at least one selection input.

The visual processor may be configured to: receive at least one captured image frame; generate at least one user interface overlay element; and combine the at least one captured image frame and the at least one user interface overlay element to generate the display image comprising the at least one visual element.

The visual processor configured to generate at least one user interface overlay element may be configured to generate at least one of: an overlay displaying the point of interest location of the at least one acoustic source; an overlay highlighting the at least one point of interest location associated with the at least one acoustic source is out of field of view of the image frame; a focus region overlay displaying a processing focus range and direction based on the at least one point of interest location associated with the at least one acoustic source; a processing overlay configured to display the toggle state for generating at least one further at least one user interface overlay element; a focus amplification overlay configured to display at least one amplification gain for reproducing the at least one audio signal from at least one sound playback transducer based on the determined trajectory; a focus attenuation overlay configured to display at least one attenuation dampening for reproducing the at least one audio signal from at least one sound playback transducer based on the determined trajectory; a focus inverter overlay configured to display a toggle state for inverting a focus operation; and a focus amplification profile overlay configured to display an amplification profile for directions surrounding the apparatus.

The apparatus may comprise a control input associated with the at least one point of interest location associated with the at least one acoustic source and wherein the processor may be configured to reproduce the at least one audio signal based on the at least one control input.

The control input may be configured to provide at least one of: a processing width for controlling the reproducing the at least one audio signal from at least one sound playback transducer; a processing range for controlling the reproducing the at least one audio signal from at least one sound playback transducer; a focus amplification factor for controlling reproducing the at least one audio signal from at least one sound playback transducer; a focus attenuation factor for controlling the reproducing the at least one audio signal from at least one sound playback transducer; an out of focus amplification factor for controlling the reproducing the at least one audio signal from at least one sound playback transducer; and an out of focus attenuation for controlling the reproducing the at least one audio signal from at least one sound playback transducer.

The at least one audio signal may comprise at least two audio signals and the spatial audio analyser may be configured to determine at least one of: from at least two audio signals at least one acoustic source comprising a location value; and at least one acoustic source from the at least one acoustic source within the at least one point of interest location associated with the at least one acoustic source.

The trajectory determiner may comprise: a feature determiner configured to determine at least at least one feature associated with at least one visual image element and/or the at least one acoustic source at the at least one point of interest location; a feature tracker configured to track the at least one feature associated with the at least one visual image element and/or the at least one acoustic source respectively; and a feature trajectory determiner configured to determine the trajectory of the at least one feature.

The apparatus may further comprise an input configured to receive the at least one audio signal from at least one of: at least two microphones; an apparatus memory; and at least one further apparatus.

The apparatus may further comprise: an image input configured to receive at least one captured image frame from which the at least one location is determined, wherein the at least one captured image frame may be received from at least one of: at least one camera; a memory; and at least one further apparatus.

According to a fifth aspect there is provided an apparatus comprising: at least one transceiver; at least one display; at least one sound playback transducer; at least one processor; at least one memory; a spatial audio analyser configured to determine, using at least one audio signal, at least one acoustic source; a location determiner configured to determining at least one point of interest location associated with the at least one acoustic source; a trajectory determiner configured to determine a trajectory of the at least one point of interest location associated with the at least one acoustic source; and a processor configured to reproduce the at least one audio signal from at least one sound playback transducer based on the determined trajectory.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For better understanding of the present application, reference will now be made by way of example to the accompanying drawings in which:

FIG. 3 shows a flow diagram of the operation of the apparatus shown in

FIG. 2 according to some embodiments;

EMBODIMENTS OF THE APPLICATION

Figure 1:
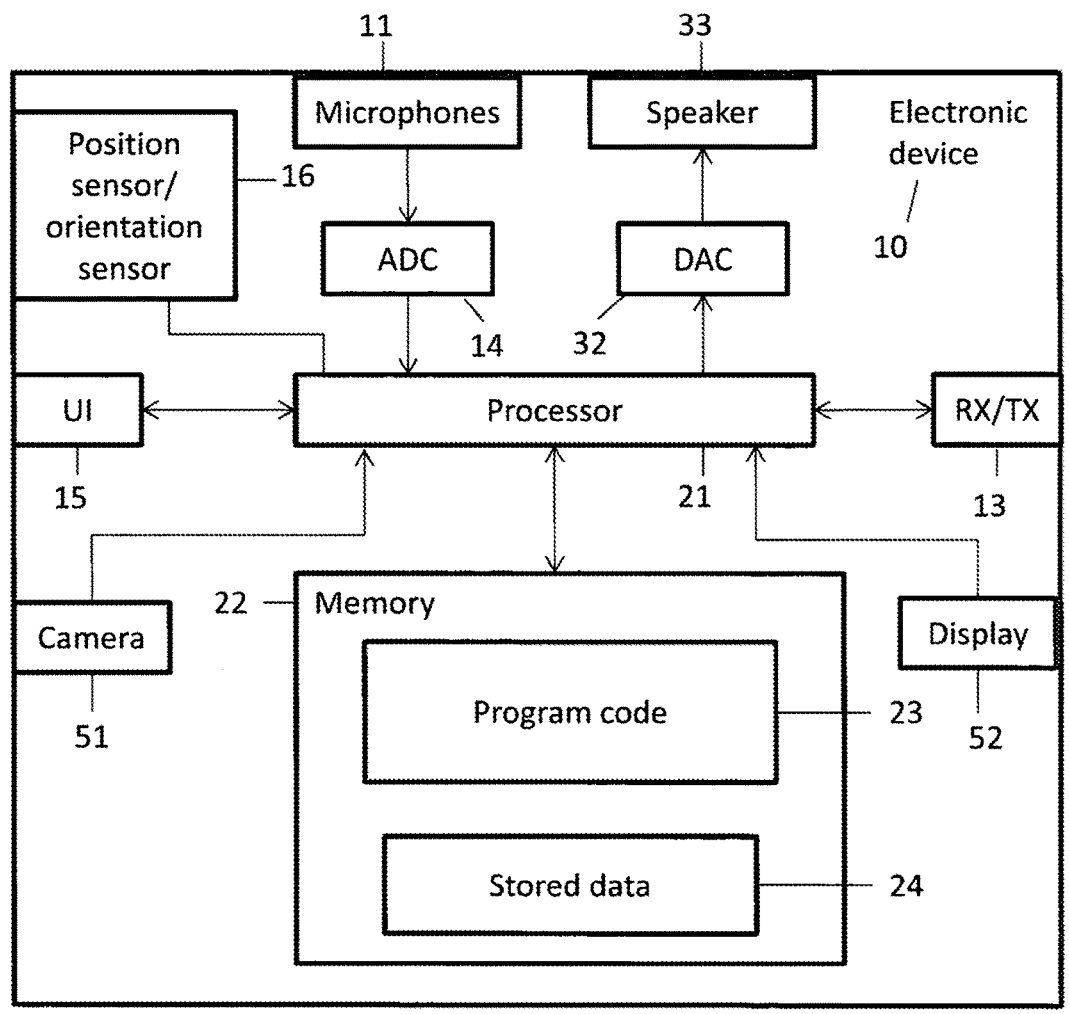
FIG. 1 shows schematically an apparatus suitable for implementing embodiments.

The following describes in further detail suitable apparatus and possible mechanisms for the provision of effective audio processing.

As described herein audio events can be captured efficiently by using multiple microphones in an array.

Multiple microphones can be used to capture efficiently audio events. However, often it is difficult to convert the captured signals into a form that the listener can experience the event as if being present when the signal was recorded. Particularly a spatial representation component can be missing in the recorded or captured audio, as the listener cannot sense the directions of the sound sources or the ambience around the listener in a manner which is identical to the original event.

Multichannel systems, such as commonly used 5.1 channel setup, can be used for representing spatial signals with sound sources in different directions and thus they can potentially be used for representing the spatial events captured by a multi-microphone system. There have been discussed efficient methods for converting multi-microphone recording or capture into a suitable multichannel audio signal format.

Furthermore in addition to multichannel systems, spatial audio can be represented as a binaural audio format signal (for replaying the audio with headphones). Methods for converting multi-microphone captured audio signals into a binaural audio signal format have been discussed.

It is understood that these formats complement each other as binaural signals generally are suitable for mobile use and multichannel setups can be used for example at home or at office.

In some methods the multi-microphone audio signals can be converted into an interim spatial audio format signal which includes directional information of the sound sources. The generation of directional information of the sound sources or audio sources derived from the multi-microphone audio signals can in some circumstances be used for spatial audio signal processing.

An example spatial audio signal processing use is where a user wants to concentrate on a particular part of the spatial field (for example where there is a sound or audio source which interests the user).

For example this can be implemented as "interactive audio manipulation" which can for example operate as follows:
1. Capture the audio field and analyze the directional information from the captured signals.
2. During video recording, indicate the direction to amplify/dampen the audio signal (for example by user tapping on the display).
3. Based on the direction of the sound source and the indicated direction, render new audio signal by modifying the spatial and direction information (for example to amplify the sounds coming from the desired direction).

Furthermore the "interactive audio manipulation" can in some embodiments provide manipulation based on object tracking, such that where the object moves the processing operation follows the object. The concept as described in the embodiments herein is to track the direction of the sound object and provide this tracking information to the spatial audio processor. Thus for example the direction of the object being processed can change over time either because the apparatus (with the microphones and/or camera) moves or sound object moves.

In some embodiments the user can select a sound source of special interest and the apparatus tracks or follows the sound source and concentrates the audio capture operation in the tracked direction.

In some embodiments the tracking operation can be based on an image or vision tracking. Thus for example when the user indicates the direction of the desired sound object to amplify by tapping on the screen of the device, the apparatus generated feature points around the area of the indicated point. Then the apparatus uses vision based tracking algorithms to track the feature points to generate a tracking direction to be provided to the audio processor.

Furthermore in some embodiments the tracking operation can be based on tracking an audio fingerprint. Thus for example when the user indicates the direction of the desired sound object, the apparatus analyzes the audio signal or sounds from that direction and generates an audio fingerprint. For all the subsequent audio frames, the algorithm analyzes the captured audio by matching the signal to the fingerprint and estimates the direction of the object. In such a manner the sound source does not have to be visible on viewfinder or within the range of the camera.

The concept as described herein further in some embodiments features generating or providing visual cues on the display of the apparatus to indicate the object whose sound is enhanced. For example in some embodiments the colours of the pixels that correspond the direction could be enhanced.

As well as being implemented in recording applications for later playback it would be understood that in some embodiments the embodiments as described herein can be implemented in real-time to dynamically change the audio source or be implemented based on previously recorded audio and video content. For example in some embodiments the overview of a suitable post-recorded embodiment is illustrated as follows:

During recording, a metadata file is generated alongside the main audio track(s) to indicate information about the direction of audio sources. The audio track(s) are stored or recorded (for example as a stereo, multichannel or mono audio signal).

During playback a direction or sound source is selected (for example by user-interface highlighting to indicate the desired sound source).

Using tracking mechanisms, and using the metadata from the recording, an audio is rendered where the direction from the calculated source is enhanced.

In this regard reference is first made to FIG. 1 which shows a schematic block diagram of an exemplary apparatus or electronic device 10, which may be used to capture or monitor the audio signals, to determine audio source directions/motion and determine whether the audio source motion matches known or determined gestures for user interface purposes.

The apparatus 10 can for example be a mobile terminal or user equipment of a wireless communication system. In some embodiments the apparatus can be an audio player or audio recorder, such as an MP3 player, a media recorder/player (also known as an MP4 player), or any suitable portable device requiring user interface inputs.

In some embodiments the apparatus can be part of a personal computer system an electronic document reader, a tablet computer, or a laptop.

The apparatus 10 can in some embodiments comprise an audio subsystem. The audio subsystem for example can include in some embodiments a microphone or array of microphones 11 for audio signal capture. In some embodiments the microphone (or at least one of the array of microphones) can be a solid state microphone, in other words capable of capturing acoustic signals and outputting a suitable digital format audio signal. In some other embodiments the microphone or array of microphones 11 can comprise any suitable microphone or audio capture means, for example a condenser microphone, capacitor microphone, electrostatic microphone, electret condenser microphone, dynamic microphone, ribbon microphone, carbon microphone, piezoelectric microphone, or microelectrical-mechanical system (MEMS) microphone. The microphone 11 or array of microphones can in some embodiments output the generated audio signal to an analogue-to-digital converter (ADC) 14.

In some embodiments the apparatus and audio subsystem includes an analogue-to-digital converter (ADC) 14 configured to receive the analogue captured audio signal from the microphones and output the audio captured signal in a suitable digital form. The analogue-to-digital converter 14 can be any suitable analogue-to-digital conversion or processing means.

In some embodiments the apparatus 10 and audio subsystem further includes a digital-to-analogue converter 32 for converting digital audio signals from a processor 21 to a suitable analogue format. The digital-to-analogue converter (DAC) or signal processing means 32 can in some embodiments be any suitable DAC technology.

Furthermore the audio subsystem can include in some embodiments a speaker 33. The speaker 33 can in some embodiments receive the output from the digital-to-analogue converter 32 and present the analogue audio signal to the user. In some embodiments the speaker 33 can be representative of a headset, for example a set of headphones, or cordless headphones.

Although the apparatus 10 is shown having both audio capture and audio presentation components, it would be understood that in some embodiments the apparatus 10 can comprise the audio capture only such that in some embodiments of the apparatus the microphone (for audio capture) and the analogue-to-digital converter are present.

In some embodiments the apparatus audio-video subsystem comprises a camera 51 or image capturing means configured to supply to the processor 21 image data. In some embodiments the camera can be configured to supply multiple images or frames over time to provide a video stream.

In some embodiments the apparatus audio-video subsystem comprises a display 52. The display or image display means can be configured to output visual images of video frames which can be viewed by the user of the apparatus. In some embodiments the display can be a touch screen display suitable for supplying input data to the apparatus. The display can be any suitable display technology, for example the display can be implemented by a flat panel comprising cells of LCD, LED, OLED, or 'plasma' display implementations.

Although the apparatus 10 is shown having both audio/video capture and audio/video presentation components, it would be understood that in some embodiments the apparatus 10 can comprise only the audio capture and audio presentation parts of the audio subsystem such that in some embodiments of the apparatus the microphone (for audio capture) or the speaker (for audio presentation) are present. Similarly in some embodiments the apparatus 10 can comprise one or the other of the video capture and video presentation parts of the video subsystem such that in some embodiments the camera 51 (for video capture) or the display 52 (for video presentation) is present.

In some embodiments the apparatus 10 comprises a processor 21. The processor 21 is coupled to the audio subsystem and specifically in some examples the analogue-to-digital converter 14 for receiving digital signals representing audio signals from the microphone 11, and the digital-to-analogue converter (DAC) 12 configured to output processed digital audio signals, the camera 51 for receiving digital signals representing video signals, and the display 52 configured to output processed digital video signals from the processor 21.

The processor 21 can be configured to execute various program codes. The implemented program codes can comprise for example source determination, audio source direction estimation, audio source processing and user interface routines.

In some embodiments the apparatus further comprises a memory 22. In some embodiments the processor 21 is coupled to memory 22. The memory 22 can be any suitable storage means. In some embodiments the memory 22 comprises a program code section 23 for storing program codes implementable upon the processor 21 such as those code routines described herein. Furthermore in some embodiments the memory 22 can further comprise a stored data section 24 for storing data, for example audio data that has been captured in accordance with the application or audio data to be processed with respect to the embodiments described herein. The implemented program code stored within the program code section 23, and the data stored within the stored data section 24 can be retrieved by the processor 21 whenever needed via a memory-processor coupling.

In some further embodiments the apparatus 10 can comprise a user interface 15. The user interface 15 can be coupled in some embodiments to the processor 21. In some embodiments the processor can control the operation of the user interface and receive inputs from the user interface 15. In some embodiments the user interface 15 can enable a user to input commands to the electronic device or apparatus 10, for example via a keypad, and/or to obtain information from the apparatus 10, for example via a display which is part of the user interface 15. The user interface 15 can in some embodiments comprise a touch screen or touch interface capable of both enabling information to be entered to the apparatus 10 and further displaying information to the user of the apparatus 10.

In some embodiments the apparatus further comprises a transceiver 13, the transceiver in such embodiments can be coupled to the processor and configured to enable a communication with other apparatus or electronic devices, for example via a wireless communications network. The transceiver 13 or any suitable transceiver or transmitter and/or receiver means can in some embodiments be configured to communicate with other electronic devices or apparatus via a wire or wired coupling.

The transceiver 13 can communicate with further devices by any suitable known communications protocol, for example in some embodiments the transceiver 13 or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

In some embodiments the transceiver is configured to transmit and/or receive the audio signals for processing according to some embodiments as discussed herein.

In some embodiments the apparatus comprises a position sensor 16 configured to estimate the position of the apparatus 10. The position sensor 16 can in some embodiments be a satellite positioning sensor such as a GPS (Global Positioning System), GLONASS or Galileo receiver.

In some embodiments the positioning sensor can be a cellular ID system or an assisted GPS system.

In some embodiments the apparatus 10 further comprises a direction or orientation sensor. The orientation/direction sensor can in some embodiments be an electronic compass, accelerometer, a gyroscope or be determined by the motion of the apparatus using the positioning estimate.

It is to be understood again that the structure of the apparatus 10 could be supplemented and varied in many ways.

Figure 2:
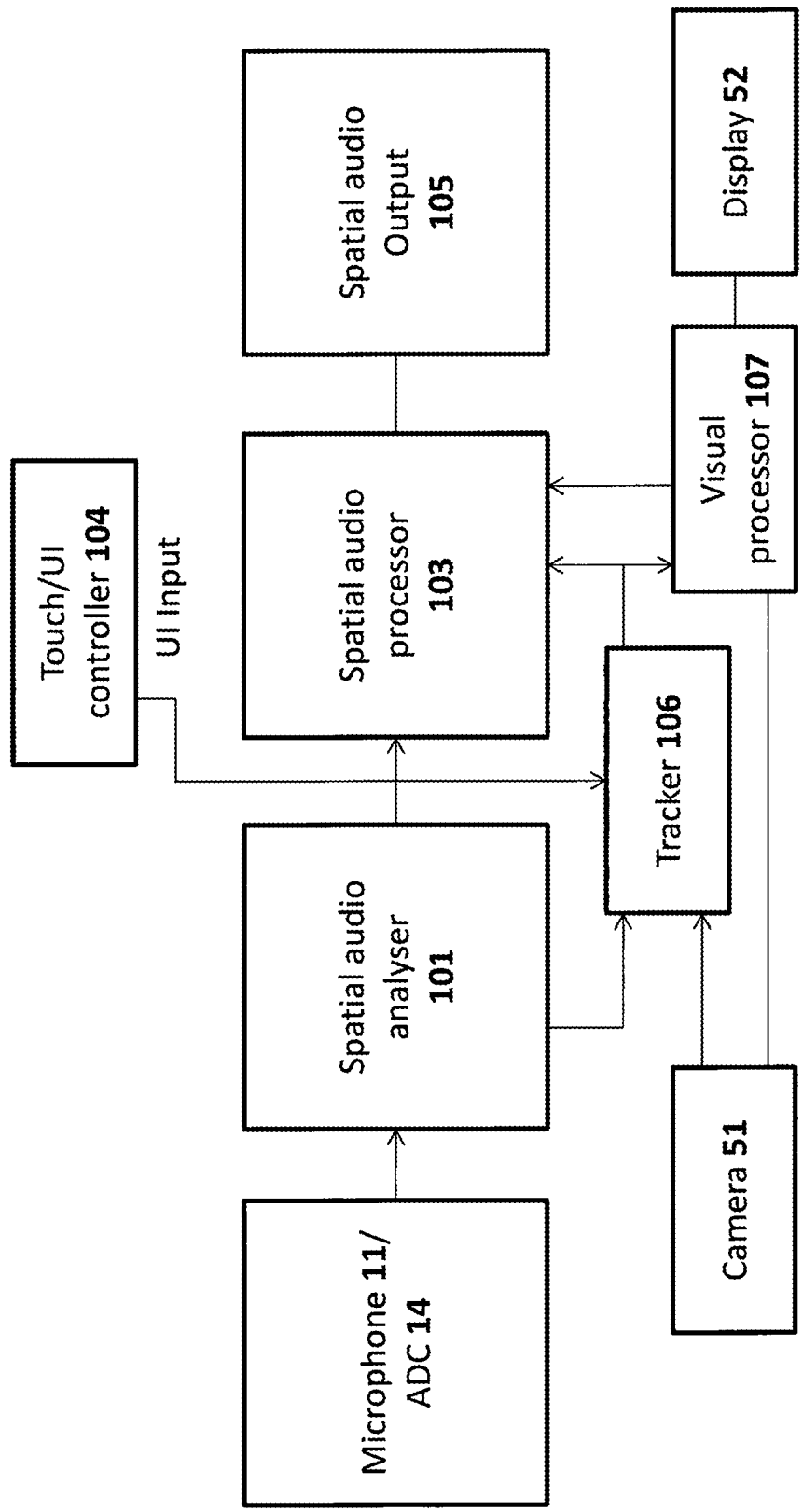
FIG. 2 shows schematically an audio-video processing apparatus suitable for implementing embodiments in further detail.

With respect to FIG. 2 the audio processor apparatus according to some embodiments is shown in further detail. Furthermore with respect to FIG. 3 the operation of such apparatus is described.

The apparatus as described herein comprise a microphone array including at least two microphones and an associated analogue-to-digital converter suitable for converting the signals from the microphone array into a suitable digital format for further processing. The microphone array can be, for example located on the apparatus at ends of the apparatus and separated by a distance d. The audio signals can therefore be considered to be captured by the microphone array and passed to a spatial audio analyser 101.

For example an example microphone array arrangement may be a first microphone, a second microphone and a third microphone. In this example the microphones are arranged at the vertices of an equilateral triangle. However the microphones can be arranged in any suitable shape or arrangement. In this example each microphone is separated by a dimension or distance d from each other and each pair of microphones can be considered to be orientated by an angle of 120° from the other two pairs of microphone forming the array. The separation between each microphone is such that the audio signal received from a signal source 131 can arrive at a first microphone, for example microphone 2 earlier than one of the other microphones, such as microphone 3. This can for example be seen by the time domain audio signal $f_1(t)$ occurring at the first time instance and the same audio signal being received at the third microphone $f_2(t)$ at a time delayed with respect to the second microphone signal by a time delay value of b.

In the following examples the processing of the audio signals with respect to a single microphone array pair is described. However it would be understood that any suitable microphone array configuration can be scaled up from pairs of microphones where the pairs define lines or planes which are offset from each other in order to monitor audio sources with respect to a single dimension, for example azimuth or elevation, two dimensions, such as azimuth and elevation and furthermore three dimensions, such as defined by azimuth, elevation and range.

Figure 3:
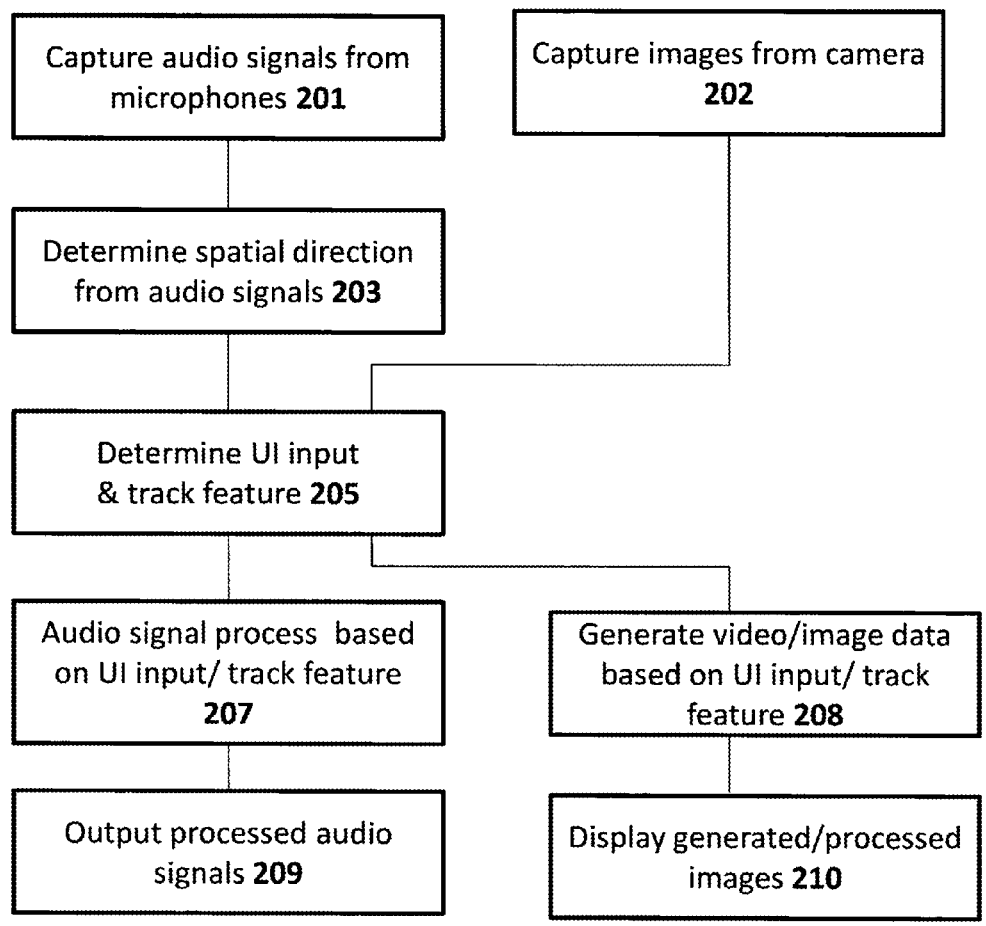

The operation of capturing acoustic signals or generating audio signals from microphones is shown in FIG. 3 by step 201.

It would be understood that in some embodiments the capturing of audio signals is performed at the same time or in parallel with capturing of images or video frames.

For example in some embodiments the apparatus comprises a camera or cameras 51 configured to generate or capture images or succession of images in the form of video of the environment surrounding the apparatus. The camera 51 can in some embodiments output these images to the tracker 106. Furthermore in some embodiments the camera can be configured to pass the visual images to a visual processor 107.

The operation of capturing images from the camera is shown in FIG. 3 by step 202

Furthermore it would be understood that in some embodiments the generating of audio signals and/or video images can represent the operation of receiving audio signals and/or video images (or retrieving audio/video signals from memory). In other words in some embodiments the 'generating' of audio signals and/or video images can be retrieving previously recorded audio signals with spatial information and/or video images such that in some embodiments the user can re-live the experience. Also in some embodiments the generating of audio signals and/or video images operations can include receiving audio/video signals via a wireless communications link or wired communications link, for example from an audio-visual server containing a large quantity of recorded content. In the following examples the generated audio are time domain representations of the audio field which are then processed by the spatial audio analyser to generate spatial representations of the audio signals. However it would be understood that in some embodiments the generated audio signals are spatial audio representations and thus can be passed directly to the audio processor 103. For example in some embodiments the apparatus is configured to receive or retrieve stored audio signals in the form of spatial domain representations which are processed by the audio processor 103.

In some embodiments the apparatus comprises a spatial audio analyser 101. The spatial audio analyser 101 is configured to, based on the inputs such as generated audio signals from the microphones or received audio signals via a communications link or from a memory, perform directional analysis to determine an estimate of the direction or location of sound, audio or acoustic sources, and furthermore in some embodiments generate an audio signal associated with the sound, acoustic or audio source and of the ambient sounds. The spatial audio analyser 101 then can be configured to output determined directional audio source and ambient sound parameters to a processor 103 or suitable spatial audio processor. In some embodiments the output of the spatial audio analyser 101 can be configured to be output to a tracker 106.

The operation of determining audio source and ambient parameters, such as audio or acoustic source spatial direction or location estimates from the at least one audio signal is shown in FIG. 3 by step 203.

In some embodiments the spatial audio analyser can comprise at least one of: a metafile determiner configured to determine at least one metafile associated with the at least one audio signal, the metafile comprising acoustic source location information. In other words in some embodiments at least one audio signal is processed but associated with the at least one audio signal is a metafile or metadata comprising information of the acoustic, sound or audio sources associated with the at least one audio signal.

An example spatial audio analyser is described herein in further detail. It would be understood that any suitable method of estimating the direction of the arriving sound can be performed other than the apparatus described herein. For example the directional analysis can in some embodiments be carried out in the time domain rather than in the frequency domain as discussed herein.

The apparatus can as described herein comprise a microphone array including at least two microphones and an associated analogue-to-digital converter suitable for converting the signals from the microphone array at least two microphones into a suitable digital format for further processing. The microphones can be, for example, be located on the apparatus at ends of the apparatus and separated by a distance d. The audio signals can therefore be considered to be captured by the microphone and passed to a spatial audio analyser.

In some embodiments the spatial audio analyser comprises a framer. The framer can be configured to receive the audio signals from the microphones and divide the digital format signals into frames or groups of audio sample data. In some embodiments the framer can furthermore be configured to window the data using any suitable windowing function. The framer can be configured to generate frames of audio signal data for each microphone input wherein the length of each frame and a degree of overlap of each frame can be any suitable value. For example in some embodiments each audio frame is 20 milliseconds long and has an overlap of 10 milliseconds between frames. The framer can be configured to output the frame audio data to a Time-to-Frequency Domain Transformer.

In some embodiments the spatial audio analyser is configured to comprise a Time-to-Frequency Domain Transformer. The Time-to-Frequency Domain Transformer can be configured to perform any suitable time-to-frequency domain transformation on the frame audio data. In some embodiments the Time-to-Frequency Domain Transformer can be a Discrete Fourier Transformer (DTF). However the Transformer can be any suitable Transformer such as a Discrete Cosine Transformer (DCT), a Modified Discrete Cosine Transformer (MDCT), or a quadrature mirror filter (QMF). The Time-to-Frequency Domain Transformer can be configured to output a frequency domain signal for each microphone input to a sub-band filter.

In some embodiments the spatial audio analyser comprises a sub-band filter. The sub-band filter can be configured to receive the frequency domain signals from the Time-to-Frequency Domain Transformer for each microphone and divide each microphone audio signal frequency domain signal into a number of sub-bands. In the following examples the sub-band filter is configured to generate B sub-bands which are indexed herein by the value $b \in [0, B-1]$.

The sub-band division can be any suitable sub-band division. For example in some embodiments the sub-band filter can be configured to operate using psycho-acoustic filtering bands. The sub-band filter can then be configured to output each domain range sub-band to a direction analyser.

In some embodiments the spatial audio analyser can comprise a direction analyser. The direction analyser can in some embodiments be configured to select a sub-band and the associated frequency domain signals for each microphone of the sub-band.

The direction analyser can then be configured to perform directional analysis on the signals in the sub-band. The directional analyser can be configured in some embodiments to perform a cross correlation between the microphone pair sub-band frequency domain signals.

In the direction analyser the delay value of the cross correlation is found which maximises the cross correlation product of the frequency domain sub-band signals. This delay time value b can in some embodiments be used to estimate the angle or represent the angle from the dominant audio signal source for the sub-band. This angle can be defined as α. It would be understood that whilst a pair or two microphones can provide a first angle, an improved directional estimate can be produced by using more than two microphones and preferably in some embodiments more than two microphones on two or more axes.

Specifically in some embodiments this direction analysis can be defined as receiving the audio sub-band data. The operation of the direction analyser according to some embodiments is described herein. The direction analyser receives the sub-band data;

$$X_k^b(n) = X_k(n_b+n), n=0, \ldots, n_{b+1}-n_b-1, b=0, \ldots, B-1$$

where $n_b$ is the first index of bth subband. In some embodiments for every subband the directional analysis as described herein as follows. First the direction is estimated with two channels (in the microphone configuration example described herein the implementation shows the use of channels 2 and 3 i.e. microphones 2 and 3). The direction analyser finds delay $\tau_b$ that maximizes the correlation between the two channels for subband b. DFT domain representation of e.g. $X_k^b(n)$ can be shifted $\tau_b$ time domain samples using $$X_{k,\tau_b}^b(n) = X_k^b(n) e^{-j\frac{2\pi n \tau_b}{N}}.$$

The optimal delay in some embodiments can be obtained from $$\max_{\tau_b} \text{Re}\left( \sum_{n=0}^{n_{b+1}-n_b-1} \left( X_{2,\tau_b}^b(n) * X_3^b(n) \right) \right), \tau_b \in [-D_{tot}, D_{tot}]$$

where Re indicates the real part of the result and * denotes complex conjugate. $X_{2,\tau_b}^b$ and $X_3^b$ are considered vectors with length of $n_{b+1}-n_b$ samples. The direction analyser can in some embodiments implement a resolution of one time domain sample for the search of the delay.

In some embodiments the direction analyser with the delay information generates a sum signal. The sum signal can be mathematically defined as.

$$X_{sum}^b = \begin{cases} (X_{2,\tau_b}^b + X_3^b)/2 & \tau_b \leq 0 \\ (X_2^b + X_{3,-\tau_b}^b)/2 & \tau_b > 0 \end{cases}$$

In other words the direction analyser is configured to generate a sum signal where the content of the channel in which an event occurs first is added with no modification, whereas the channel in which the event occurs later is shifted to obtain best match to the first channel.

It would be understood that the delay or shift $\tau_b$ indicates how much closer the sound source is to the microphone 2 than microphone 3 (when $\tau_b$ is positive sound source is closer to microphone 2 than microphone 3). The direction analyser can be configured to determine actual difference in distance as $$\Delta_{22} = \frac{v\tau_b}{F_s}$$

where Fs is the sampling rate of the signal and v is the speed of the signal in air (or in water if we are making underwater recordings).

The angle of the arriving sound is determined by the direction analyser as, $$\alpha_b = \pm\cos^{-1}\left(\frac{\Delta_{23}^2 + 2r\Delta_{23} - d^2}{2dr}\right)$$

where d is the distance between the pair of microphones and r is the estimated distance between sound sources and nearest microphone. In some embodiments the direction analyser can be configured to set the value of r to a fixed value. For example r=2 meters has been found to provide stable results.

It would be understood that the determination described herein provides two alternatives for the direction of the arriving sound as the exact direction cannot be determined with only two microphones.

In some embodiments the directional analyser can be configured to use audio signals from a third channel or the third microphone to define which of the signs in the determination is correct. The distances between the third channel or microphone (microphone 1) and the two estimated sound sources are:

$$\delta^+ = \sqrt{(h+r\sin(\dot{\alpha}_b))^2 + (d/2+r\cos(\dot{\alpha}_b))^2}$$

$$\delta^- = \sqrt{(h-r\sin(\dot{\alpha}_b))^2 + (d/2+r\cos(\dot{\alpha}_b))^2}$$

where h is the height of the equilateral triangle, i.e.

$$h = \frac{\sqrt{3}}{2}d.$$

The distances in the above determination can be considered to be equal to delays (in samples) of;

$$\tau_b^+ = \frac{\delta^+ - r}{v}F_s$$

$$\tau_b^- = \frac{\delta^- - r}{v}F_s$$

Out of these two delays the direction analyser in some embodiments is configured to select the one which provides better correlation with the sum signal. The correlations can for example be represented as $$c_b^+ = \text{Re}\left(\sum_{n=0}^{n_{b+1}-n_b-1}\left(X_{sum,\tau_b^+}^b(n) * X_1^b(n)\right)\right)$$

$$c_b^- = \text{Re}\left(\sum_{n=0}^{n_{b+1}-n_b-1}\left(X_{sum,\tau_b^-}^b(n) * X_1^b(n)\right)\right)$$

The directional analyser can then in some embodiments determine the direction of the dominant sound source for subband b as:

$$\alpha_b = \begin{cases} \dot{\alpha}_b & c_b^+ \geq c_b^- \\ -\dot{\alpha}_b & c_b^+ < c_b^- \end{cases}.$$

In some embodiments the spatial audio analyser further comprises a mid/side signal generator. Following the directional analysis, the mid/side signal generator can be configured to determine the mid and side signals for each subband. The main content in the mid signal is the dominant sound source found from the directional analysis. Similarly the side signal contains the other parts or ambient audio from the generated audio signals. In some embodiments the mid/side signal generator can determine the mid M and side S signals for the sub-band according to the following equations:

$$M^b = \begin{cases} (X_{2,\tau_b}^b + X_3^b)/2 & \tau_b \leq 0 \\ (X_2^b + X_{3,-\tau_b}^b)/2 & \tau_b > 0 \end{cases}$$

$$S^b = \begin{cases} (X_{2,\tau_b}^b - X_3^b)/2 & \tau_b \leq 0 \\ (X_2^b - X_{3,-\tau_b}^b)/2 & \tau_b > 0 \end{cases}$$

It is noted that the mid signal M is the same signal that was already determined previously and in some embodiments the mid signal can be obtained as part of the direction analysis. The mid and side signals can be constructed in a perceptually safe manner such that the signal in which an event occurs first is not shifted in the delay alignment. The mid and side signals can be determined in such a manner in some embodiments is suitable where the microphones are relatively close to each other. Where the distance between the microphones is significant in relation to the distance to the sound source then the mid/side signal generator can be configured to perform a modified mid and side signal determination where the channel is always modified to provide a best match with the main channel.

The operation may determine whether or not all of the sub-bands have been processed.

Where all of the sub-bands have been processed, the end operation is performed.

Where not all of the sub-bands have been processed, the operation can pass to the operation of selecting the next sub-band.

In some embodiments the apparatus comprises a touch/user interface controller 104. The touch/user interface controller 104 can be configured to receive at least one user input to select a region, sector or area within which the audio processor can 'focus' on. In some embodiments the selected region, sector or area is one within which an audio source occurs. For example the touch/user interface controller 104 can in some embodiments select a direction or location, for example entering a directional value on the keypad, or selecting a direction using a joystick/pointer. In some embodiments the touch/user interface controller 104 is configured to receive a user input from the touch screen display (for example the display 52) displaying an image captured by the camera. The touch/user interface controller 104 can in some embodiments be configured to generate a location or directional value based on the display, and the known orientation of the apparatus. In some embodiments the touch/user interface controller 104 can be configured to output the location or direction (or more generally a selection) to the tracker 106. In the following examples the selection is a location or orientation, however any suitable feature selection can be employed.

Although the following examples show a user input from a touch user interface controller to select at least one point of interest location associated with at least one acoustic source by determining at least one user input location it would be appreciated that in some embodiments the at least one point of interest location associated with at least one acoustic source can be determined by other means. For example in some embodiments the determination of the at least one point of interest location associated with the at least one acoustic source can be generated by determining at least one location associated with at least one audio signal. In other words the processing to the audio signal generates an indication of the point of interest location—for example the loudest source, the source which matches a defined frequency spectrum or other output. Furthermore it would be understood that in some embodiments the determination of the at least one point of interest location associated with the at least one acoustic source can be determined by determining at least one location associated with a visual image element from an image frame. For example the image may detect a shape or colour which the apparatus is to track—for example a face.

Thus for example in some embodiments the display can display an image generated by a visual processor which provides at least one visual image element, within a region of a display, of the at least one acoustic source; and further the visual processor can determine at least one point of interest location associated with the at least one visual element, wherein determining at least one point of interest location associated with the at least one acoustic source to determine the at least one point of interest location associated with the at least one acoustic source as the at least one point of interest location associated with the at least one visual element.

In some embodiments the apparatus comprises a tracker 106. The tracker 106 or trajectory determiner or means for determining the trajectory can in some embodiments be configured to receive the touch/user interface controller 104 indicated location or selection (or in some embodiments at least one point of interest location associated with the at least one acoustic source), an input from the camera 51 comprising image data, and an input from the spatial audio analyser 101 containing audio signal data. The tracker 106 can in some embodiments be configured to track the selection based on the touch/user interface controller input as an initial selection input and the audio and/or video input to track the selection. This tracked selection, such as a tracked direction indication, or tracked location and range, can then be passed to the spatial audio processor 103 and/or the visual processor 107.

The operation of determining a user interface input and tracking the selected feature is shown in FIG. 3 by step 205.

In some embodiments the tracker 106 comprises a feature selector. The feature selector is configured to receive the touch/user interface controller user interface input, and at least one of the spatial audio analyser output and the camera output. The feature selector can be configured to process at least one of the analysed spatial audio signals and the camera video signals to determine a suitable feature set within the selection (such as the region location and range) selected by the user interface input. For example the feature selector can be configured to receive the user interface indication of the desired sound object to be processed. This user interface indication can in some embodiments be a tap on a screen of the apparatus display indicating a direction to focus on.

In embodiments defining the feature based on visual information the feature selector can be configured to generate at least one visual descriptor of the area around the user indicated location. The visual descriptor can be generated according to any suitable visual feature analysis and comprise at least one visual component or parameter. For example in some embodiments the visual descriptor comprises the pixel values (such as the luma and chroma) of the area around the user indicator. In some other embodiments the visual descriptor can comprise a scale invariant feature descriptor (SAFT). Furthermore in some embodiments the visual descriptor comprises corner or edge information such as provided by a corner or edge detector, or can comprise a colour or shape descriptor.

In some embodiments defining the feature based on audio information the feature selector can be configured to receive the spatially analysed audio signals from the spatial audio analyser 101 and the user interface input of an indication of a direction and be configured to attempt to match one of the spatially analysed audio signal components with the direction. In other words a three-dimensional picture of the audio environment surrounding the apparatus is provided with the location of the main sound sources indicated and the user can select one to follow. In some embodiments the feature selector can be configured to generate an acoustic fingerprint (or audio descriptor) for the sound source arriving from the indicated location or direction. The acoustic fingerprint can be generated by analysing at least one audio feature or parameter associated with the audio source for example the audio fingerprint can be generated by analysing the spectral characteristics of the sound or audio source within the selection or selection region. However it would be understood that any feature or parameter or combination of features or parameters can be used to define an audio fingerprint of an audio source or sources within the selection or selected region.

The feature selector can in some embodiments provide the visual descriptor and/or audio fingerprint representing the user interface location or selection to the feature tracker.

In some embodiments the tracker 106 comprises a feature tracker. The feature tracker receives from the feature selector the selected features (in the form of visual descriptor and/or audio fingerprint) and attempts to track the feature in successive video frames/audio frames to provide an updated location (or direction or orientation) for the spatial audio processor and/or visual processor.

Furthermore in some embodiments the tracker or trajectory determiner further comprises a trajectory determiner configured to determine a trajectory of the at least one point of interest location associated with the at least one acoustic source based on the feature tracker output.

Thus in some embodiments where image based tracking is employed further or subsequent frames are analysed to determine the position of the visual descriptor relative to the original position of the visual descriptor and therefore determine whether there is motion of the selection (in other words the selected image associated with the audio source to be processed) over time. For example in some embodiments the feature tracker is configured to generate a motion vector defining the motion of selected visual descriptors between succeeding image frames which defines a direction and speed of motion of the selection. It would be understood that in some embodiments any suitable tracking of the visual descriptor can be used.

In some embodiments the vision based tracking performed by the feature tracker can be configured such that where the visual descriptor leaves the viewing area of the camera, for example because of motion of the camera or of the object being tracked, the tracking can pause and can be restarted if or when the object with the visual descriptor values re-enters the viewing area.

In some embodiments where the selection (sound object) is not visible, such as the selection leaving the viewing area or the apparatus moving away from the originally selection then the feature tracker can be configured to output suitable information to pause the audio processing and/or display a message indicating that the object is not visible.

The feature tracker in embodiments where audio or acoustic fingerprint tracking is employed can be configured to perform analysis on subsequent audio frames to determine the location of the audio source with the best matching fingerprint. For example in some embodiments the feature tracker can be configured to detect sound or audio sources with similar features and in the neighbourhood to the originally selected sound or audio sources. In some embodiments the feature tracker for acoustic or audio tracking can be configured to determine where the sound or audio source pauses (or where the audio or sound source disappears). For example where there is a break in the sound source continuity because of conversational pause.

In some embodiments the feature tracker can be configured to monitor the acoustic fingerprint or the visual descriptor over time to determine where the acoustic fingerprint or the visual descriptor changes and maintain a current acoustic fingerprint or the visual descriptor to prevent the feature tracker losing the feature. For example the selection (the audio source) is associated with a human voice the acoustic fingerprint can change as the person turns to or from the apparatus or the visual descriptor can change similarly.

In some embodiments both the audio/acoustic and visual-based tracking can be combined to attempt to produce a better or more reliable tracking.

The output of the feature tracker can then be provided to the spatial audio processor 103 and/or the visual processor 107.

In the following examples the tracker or trajectory determiner is configured to output an orientation (θ) and width (w) representing the location and width (which may be in angle or other form) of the selection relative to a reference orientation of the apparatus (which in some embodiments is the centre line of the camera orientation). However it would be understood that in some embodiments any suitable location selection parameter or parameters can be passed to the spatial audio processor 103 and/or the visual processor 107. For example the location selection parameter can comprise a direction and width, where the direction is independent of the orientation of the apparatus.

In some embodiments the apparatus comprises an audio processor 103. The audio processor is in some embodiments configured to receive a selection or feature input from the tracker 106 based on the determined trajectory of the at least one point of interest location associated with the at least one acoustic source.

An example audio processor 103 is described herein according to some embodiments.

In some embodiments the audio processor 103 comprises a spatial smoother and a spatial smoother filter generator. The spatial smoother and spatial smoother filter generator are configured to avoid generating sudden gain "cut-offs" at the defined sector edges. In some embodiments the spatial smoother is configured to receive the location selection parameter, such as the location (focus orientation) and width and generate additional smoothing zones to both sides of the defined sector. For example in some embodiments the defined sector orientation and width are defined by a sector start orientation $\theta_{low}$ and a sector end orientation $\theta_{high}$ the difference of which is therefore the sector width w, and the average or mean of the two is the sector orientation.

In some embodiments the smoothing zone width can be determined as $w_S=0.15(|\theta_{high}-\theta_{low}|)$ and the angle terms corresponding to the lower and upper edges of the focus sector ($\theta_{low}$ and $\theta_{high}$)) as well as the lower and upper smoothing zone limits ($\theta_{LS}=\theta_{low}-w_S$ and $\theta_{HS}=\theta_{high}+w_S$). The spatial smoother in some embodiments is configured to output the sector and smoothing zone information to a spatial smother filter generator.

In some embodiments the audio processor 103 comprises a spatial smoother filter generator. The spatial smoother filter generator is configured to receive the spatial smoother output, in other words the smoothing zone information and the audio source directional information and generate a Boolean variable stating whether the spatial source is within the smoothing zone. In some embodiments the Boolean variable z(b), stating whether a direction estimate of band b (α(b)) belongs to the smoothing zone or not, is defined as $$z(b) = \begin{cases} 0, & \text{if } \alpha(b) < \theta_{LS}, \\ 1, & \text{if } \theta_{LS} \le \alpha(b) < \theta_{low}, \\ 0, & \text{if } \theta_{low} \le \alpha(b) \le \theta_{high}, \\ 1, & \text{if } \theta_{high} < \alpha(b) \le \theta_{HS}, \\ 0, & \text{if } \alpha(b) > \theta_{HS}, \end{cases}$$

The spatial smoother filter generator can then output the Boolean variable z(b) to the spatial focuser.

In some embodiments the visual audio processor 103 comprises a spatial focuser. The spatial focuser is configured to receive the audio source information in terms of mid signal (M), side signal (S) and location (α) of the audio sources from the spatial audio analyser 101. Furthermore the spatial focuser can receive the selection parameters from the tracker 106 such as the focus sector information (θ, w) and the spatial smoother filter boolean values z(b) from the spatial smoother filter generator. The spatial focuser is then configured to perform spatial focusing on the audio sources.

A (positive) focusing effect or operation attempts to amplify the audio sources within the focus sector and attenuate audio sources outside of the sector. Furthermore in some embodiments the spatial focuser is configured to generate an angle difference between the estimated audio source location and the focus sector edges when the spatial smoother filter Boolean value z(b) is true. In some embodiments the angle difference $\Delta_{min}$ between α(b) and the focus sector edges can be computed as $$\Delta_{min} = \begin{cases} |\alpha(b) - \theta_{low}|, & \text{if } \theta_{LS} \le \alpha(b) < \theta_{low}, \\ \alpha(b) - \theta_{high}, & \text{if } \theta_{high} < \alpha(b) \le \theta_{HS}. \end{cases}$$

In some embodiments whenever the angle estimation is located inside the focus sector or smoothing zones then the corresponding subband b is amplified to generate the focused effect. In contrast where the location of the audio source is located elsewhere in the spatial environment the subband b is dampened or attenuated. In some embodiments the focusing processing can be performed separately for the mid (M) and side (S) signals and as described herein can vary depending on the desired output mode.

It would be understood that in some embodiments, a negative focusing or filtering on the sector can also be applied. In such embodiments, for example to remove undesired audio sources from a sector, the audio sources within the sector are dampened or attenuated and the audio sources outside of the sector are amplified. In the examples described herein the positive focusing effect is described generally however it would be understood that a similar negative focusing can also be generated in some embodiments by replacing the gain or amplification term for source within the sector with a dampening or attenuation term and replacing the dampening or attenuation term for sources outside of the sector with a gain or amplification term.

In some embodiments the spatial focuser can be configured to generate a gain term for the audio sources within the focus sector.

The spatial focuser in some embodiments can be configured to process the audio signals and generate a suitable binaural output. For example in some embodiments to perform a proper amplification or dampening to a subband b in a binaural mode, the gain level for a subband b is modified accordingly. For amplification, the following gain term can in some embodiments be applied:

$$G(b)=1+amp(b),$$

where amp(b) is the amplification coefficient corresponding to subband b. The amplification coefficient in some embodiments can be determined by the user, for example by a slider such as shown in the user interface examples described herein (in which case the amplification coefficient can in some embodiments be defined as being equal for all subbands $b \in \{1,B\}$) or in some embodiments the amplification coefficient can be derived subband-wise based on the amount of zooming in the audio field. In some embodiments a suitable value range for amp(b) is between 0.2 and 0.8.

In some embodiments where the direction estimate $\alpha(b)$ is located inside the smoothing zone ($z(b)=1$), the gain term G(b) is modified by the following expression:

$$G(b) = -[G(b) - (1 - att(b))]\frac{\Delta_{min}}{w_S} + G(b),$$

where att(b) is the attenuation coefficient for subband b. In some embodiments the attenuation constant which defines the amount of dampening can be determined by the user interface input or computed based on the amount of zooming. Suitable values for the attenuation coefficient att(b) range from 0.0 to 1.0. As can be seen, the smoothing zones cause a linear decrease on the gain term G(b) as a function of angle difference $\Delta_{min}$. However it would be understood that in some embodiments any suitable interpolation (linear or non-linear) between the gain term and the attenuation coefficient can be employed.

In some embodiments the spatial focuser can be configured to perform dampening on audio sources with a location $\alpha(b)$ which lies both outside the focus sector and the smoothing zones. In such embodiments the gain term for such sub-bands is defined by $$G(b)=1-att(b).$$

Furthermore in some embodiments the received mid-signals are filtered using corresponding head related transfer function coefficients to generate left $M_L(b)$ and right $M_R(b)$ mid signals.

Then in some embodiments the spatial focuser can be configured to the gain terms are applied to the left and right mid signals to generate left and right focused mid signals $$M_L(b)=G(b)M_L(b),$$

$$M_R(b)=G(b)M_R(b),$$

The spatial focuser in some embodiments can be configured to process the audio signals and generate a suitable multichannel output. In such embodiments the spatial focuser can be configured to determine the multichannel mode channel positions. In the following examples a five channel multichannel configuration is determined the channel order is defined as front left (FL), front right (FR), center (C), rear left (RL) and rear right (RR), corresponding to angles A=[30,−30,0,110,−110] (in degrees).

The spatial focuser can then in some embodiments be configured to determine the audio channel with the smallest angle difference to $\alpha(b)$ searched as $$\Delta(j) = |A(j) - \alpha(b)|,$$
$$j \in \{1, 5\}$$
$$c_1 = \underset{j}{\operatorname{argmin}} (\Delta(j)),$$

where A(j) stands for the angle of the jth audio channel, $\Delta(j)$ is the angle difference to channel j, and $c_1$ is the index of the nearest channel to the angle estimation. It would be understood that in most cases the obtained direction estimates are not directly located to any channel position and thus audio panning needs to be considered during the synthesis process. Thus in some embodiments the spatial focuser 805 can be configured to determine the two audio channels on either side of $\alpha(b)$. In some embodiments this can be determined based on the known channel geometry. In such embodiments the spatial focuser can determine which side of $c_1$ the angle $\alpha(b)$ is located at. The side can then be defined as being positive (+) or negative (−) according to the sign of the angle difference $\Delta(c_1)$ (in other words omitting the absolute value from the difference determination shown above). In the positive case, the channel next in a counter clockwise direction from $c_1$ is considered as the second closest channel, $c_2$ (and vice versa in the negative case the channel next in a clockwise direction from $c_1$ is considered to be the second closest channel $c_2$). The spatial focuser can then also determine the angle difference ($c_2$) between $\alpha(b)$ and the second channel $c_2$.

In some embodiments the spatial focuser 805 can then be configured to determine the relationship R between the determined angle differences and scaled between 0 and $\pi/2$ as $$R = \frac{\Delta(c_1)}{\Delta(c_2)}\pi/2,$$

The spatial focuser can then in some embodiments be configured to apply the relationship in calculating proportional gain values for the channels. In some embodiments it is assumed that the channel gains obey the relation:

$$G_1^2+G_2^2=1,$$

where $G_1$ and $G_2$ are the proportional gain values for the channels $c_1$ and $c_2$, respectively. In the middle point between the channels the gain values are equal; $G_1=G_2=1/\sqrt{2}$. Thus based on this assumption, the gain values for $c_1$ and $c_2$ (of subband b) can be determined as, $$G_2(b) = \sin(R)\frac{1}{\sqrt{2}},$$
$$G_1(b) = \sqrt{1 - G_2(b)^2}.$$

In some embodiments, for a 5 channel mode example, whenever the focus sector angle θ is located between −45° and 45°, the amplification gain is divided between all three front speaker channels rather than between the two closest channels. This is implemented because of the small angle distances between the front speakers can cause panning between only two speakers to produce potential artifacts and unnatural audio outputs in certain front focus directions. The threshold angles of ±45° is defined empirically by evaluating the output against few other angle values however other front threshold values can be used. The spatial focuser 805 can in some embodiments be configured to define the second and third channels based on the geometrical division rules provided by the table herein.

| $c_1$ | $c_2$ | $c_3$ |
|---|---|---|
| FL | C | FR |
| FR | C | FL |
| C | $\begin{cases} FR, & \text{if } A(C) - a(b) \geq 0 \\ FL, & \text{else} \end{cases}$ | $\begin{cases} FL, & \text{if } A(C) - a(b) \geq 0 \\ FR, & \text{else} \end{cases}$ |

In these cases, the angle relation between the closest and the third channel is determined. The middle-point channel gains update to $G_1 = G_2 = G_3 = 1/\sqrt{3}$, and the corresponding relations are computed as:

$$R_1 = \frac{\Delta(c_1)}{\Delta(c_2)}\pi/2,$$

$$R_2 = \frac{\Delta(c_1)}{\Delta(c_3)}\pi/2.$$

Accordingly, it is now assumed that the channel gains have the following relation:

$$G_1^2 + G_2^2 + G_3^2 = 1,$$

which means that the proportional gain values for $c_1$, $c_2$ and $c_3$ can be then obtained by:

$$G_3(b) = \sin(R_2)\frac{1}{\sqrt{3}},$$

$$G_2(b) = \sin(R_1)\frac{1}{\sqrt{3}},$$

$$G_1(b) = \sqrt{1 - G_2(b)^2 - G_3(b)^2}$$

The spatial focuser can then in some embodiments be configured to determine final gain values for the focused channels by using the proportional gains. For example the final gains can in some embodiments be determined according to the following expression:

$$\hat{G}_X(b) = 1 + G_X(b)amp(b), X \in \{1,3\}.$$

The spatial focuser can then in some embodiments be configured to determine for the remaining two channels (or three when only two channels are applied in the panning) gain values which dampen the channels in order to emphasize the focus effect. Where the estimated angle α(b) for a sub-band belongs to the smoothing zone, the gain values are updated as, $$\hat{G}_X(b) = -[\hat{G}_X(b) - (1 - att(b))]\frac{\Delta_{min}}{w_s} + \hat{G}_X(b).$$

It can be seen that the example scaling logic is similar to that shown with respect to the binaural mode.

In some embodiments the spatial focuser can be configured such that whenever α(b) is not inside the focus sector or smoothing zones, dampening is performed to all channels except for the channel closest to the focus angle θ. In some embodiments this can be implemented by setting the gain values to $$\hat{G}_X(b) = 1 - att(b), X \in \{1, \ldots, 5\} \wedge X \neq i,$$

where i is the index of the channel nearest to θ. The remaining channel is left untouched, i.e. $\hat{G}_i(b) = 1$. This is done to avoid dampening potential non-dominant sound sources and original background noise arriving from the focused direction, as also those should be heard as focused at the synthesized output.

The spatial focuser can then in some embodiments be configured to determine the actual channel scaling coefficients $\hat{g}_X(b)$ based on the computed gain values $\hat{G}_X(b)$
Amplification:

$$\hat{g}_1(b) = \hat{g}_1(b)\hat{G}_1(b), \hat{g}_2(b) = \hat{g}_2(b)\hat{G}_2(b), \hat{g}_3(b) = \hat{g}_3(b)\hat{G}_3(b),$$

$$\hat{g}_X(b) = \hat{g}_X(b)(1 - att(b)),$$

Dampening:

$$\hat{g}_X(b) = \hat{g}_X(b)\hat{G}_X(b),$$

where $\hat{g}_1(b)$, $\hat{g}_2(b)$ and $\hat{g}_3(b)$ stand for the scaling coefficients of the channels $c_1$, $c_2$ and $c_3$, respectively.

Furthermore the spatial focuser can then in some embodiments be configured to determine the directional and focused components are obtained using the mid signal M(b) as $$C_M(b) = \hat{g}_C(b)M(b),$$

$$FL_M(b) = \hat{g}_{FL}(b)M(b),$$

$$FR_M(b) = \hat{g}_{FR}(b)M(b),$$

$$RL_M(b) = \hat{g}_{RL}(b)M(b),$$

$$RR_M(b) = \hat{g}_{RR}(b)M(b).$$

It would be understood that in some embodiments due to some ambiguities and disturbances in many recorded audio signals, reliable direction estimates may be obtained for all the subbands. For example usually the number of valid direction estimates for the subband determination can vary between 18 and 22 per frame. In such embodiments both in the binaural and the multi-channel modes, the described focus procedure can be performed to only those subbands with valid direction estimates to prevent emphasizing potentially incorrect directions. In some embodiments to overcome such a limitation, an additional gain control procedure as described herein is applied which allows modifying every subband by means of statistical analysis.

In some embodiments the spatial focuser can be further configured to process the side signal S(b). It would be understood that since there is no directional information included in the side signal S(b), in the binaural mode the audio focuser has no effect to the side signal synthesis.

In other words the side signal is added un-modified to the processed mid signal.

However, in multi-channel synthesis, the focusing effect can also be applied to the side signal by considering the focus angle $\theta$ as the obtained angle estimation $\alpha$ for all subbands. The ambient signal is hence amplified in the focused direction to enhance the overall focus effect. It would be understood however that the amplification of side signal components should be performed with caution to retain a natural tone in the synthesized output signal. For example a too high amplification of the side signal focus tends to "draw" the whole audio scene towards the specified angle, which should be avoided.

For example in some embodiments the spatial focuser 805, once the proportional gain values $G_X$ are obtained for the multi-channel synthesis, the actual side signal scaling factors $\gamma_X$ for each channel can be derived as $$\gamma_1 = \hat{\gamma}[1] + G_1 amp_S, \gamma_2 = \hat{\gamma}[2] + G_2 amp_S, \gamma_3 = \hat{\gamma}[3] + G_3 amp_S,$$

$$\gamma_X = \hat{\gamma}[X](1 - att_S),$$

where $\hat{\gamma} = [0.25, 0.25, 0.25, 0.38, 0.38]$ is a vector containing fixed, "unbalanced", gamma values for each channel, and $amp_S$ and $att_S$ are the amplification and attenuation factors for the side signal, respectively. In some embodiments suitable values for these vary between 0.1 and 0.3.

In some embodiments the output of the spatial focuser can be passed to the post processing gain control/temporal smoother.

In some embodiments the audio processor 103 further comprises a post processing gain control/temporal smoother.

In some embodiments (for both the multi-channel and binaural syntheses) the processed mid signals can be further processed to further enhance the focus effect.

In other words in some embodiments whenever a determined amount of direction estimates are obtained inside the focus sector within a single time frame, all the subbands are further modified by additional gain coefficients.

Furthermore in some embodiments the post processing gain control/temporal smoother can be configured to apply temporal smoothing to avoid sudden gain changes over consecutive frames.

In some embodiments the post processing gain controller/temporal smoother 807 can be configured to determine the sub-band thresholds that are used to determine whether additional gain control is to be applied. In some embodiments the sub-band thresholds are based on experimental testing and the applied number of sub-bands. For example in a B=32 case the thresholds for additional gain amplification and attenuation can be determined as $th_{amp} = 8$ and $th_{att} = 4$, respectively. These thresholds correspond to the minimum and maximum number of direction estimates allowed inside the focused sector in a single frame for triggering the additional gain control process. It would be understood that in some embodiments the example applied number of sub-bands (B=32) represents only one possibility among many others and as such any suitable number of sub-bands may be also applied (which can then cause the thresholds to change accordingly).

In some embodiments the post processing gain controller/temporal smoother 807 can be configured to determine the number of direction estimates inside the focused sector, E and further compare the value of E to the set thresholds. In other words by evaluating the number of valid in-sector direction estimates in some situations the post processing gain controller/temporal smoother 1807 can be configured to amplify or dampen all the 32 subbands within the current time frame, including also those bands with unreliable/unknown $\alpha(b)$ estimates obtained in the spatial audio analyser.

In some embodiments the additional amplification is applied only to those audio source bands within the focus sector or where the direction is unreliable/unknown when the threshold is met. Similarly in some embodiments the bands with estimates inside the sector are not affected by additional dampening (based on the set thresholds, there are at most 3 such bands in that case).

For example in binaural synthesis modes, the following equations can be applied for additional amplification in some embodiments where $E \geq th_{amp}$ $$M_L(b) = M_L(b)(1 + amp_{add}),$$

$$M_R(b) = M_R(b)(1 + amp_{add}),$$

and additional attenuation where $E < th_{att}$:

$$M_L(b) = M_L(b)(1 - att_{add}),$$

$$M_R(b) = M_R(b)(1 - att_{add}).$$

The terms $amp_{add}$ and $att_{add}$ are additional amplification and attenuation coefficients derived from the original amp and att coefficients. The additional gain coefficients in some embodiments are static and fixed among the sub-bands (in other words they are not affected by the amount of zooming).

In the multi-channel synthesis modes, the following equations are applied for the channel scaling coefficients:

Amplification: $\hat{g}_X(b) = \hat{g}_X(b)(1 + amp_{add}),$

Dampening: $\hat{g}_X(b) = \hat{g}_X(b)(1 - att_{add}),$ which are then applied to $$\hat{g}_1(b) = \hat{g}_1(b)\hat{G}_1(b), \hat{g}_2(b) = \hat{g}_2(b)\hat{G}_2(b), \hat{g}_3(b) = \hat{g}_3(b)\hat{G}_3(b),$$

$$\hat{g}_X(b) = \hat{g}_X(b)(1 - att(b)),$$

$$\hat{g}_X(b) = \hat{g}_X(b)\hat{G}_X(b),$$

where $\hat{g}_1(b)$, $\hat{g}_2(b)$ and $\hat{g}_3(b)$ stand for the scaling coefficients of the channels $c_1$, $c_2$ and $c_3$, respectively. The directional and focused components are obtained using the mid signal $M(b)$ as $$C_M(b) = \hat{g}_C(b)M(b),$$

$$FL_M(b) = \hat{g}_{FL}(b)M(b),$$

$$FR_M(b) = \hat{g}_{FR}(b)M(b),$$

$$RL_M(b) = \hat{g}_{RL}(b)M(b),$$

$$RR_M(b) = \hat{g}_{RR}(b)M(b).$$

to obtain the actual audio channel signals.

In some embodiments the post processing gain controller/temporal smoother 807 can further apply temporal smoothing to the audio signals based on the past history of frame states.

In some embodiments the audio processor 103 further comprises a channel mode converter. The channel mode converter can in some embodiments be configured to receive the processed mid and side signals and generate suitable channel outputs.

For example in some embodiments the channel mode converter is configured to generate a stereo signal suitable for headphone listening from a multichannel processed signal.

In some embodiments the mode converter is configured to perform a conversion directly from the multi-channel synthesis output by using the following conversion formulas:

$$L(z)=FL(z)+0.71C(z)+0.71RL(z),$$

$$R(z)=FR(z)+0.71C(z)+0.71RR(z),$$

where X(z) corresponds to the time-domain signal of channel x.

In some embodiments the mode converter is configured to use the focused mid-signals M(b) of the multi-channel synthesis and consider the original (non-focused) side-signals. In these embodiments the stereo signal conversion is performed in the frequency domain, once the focusing effect is combined with the mid-signal components. The stereo conversion is performed as shown above with respect to other embodiments however the operations are performed to frequency domain coefficients such as $C_M(b)=\hat{g}_C(b)M(b)$, separately for each frequency bin n at each subband b and the side signal S(b) is added to the right channel and removed from the left one. The transformation to the time domain can in some embodiments be performed using an inverse Fourier transform (IFT). In such embodiments a "smoother" and more stable background noise compared to the first "direct" conversion option is generated.

In some embodiments the mode converter is configured to perform audio panning on the angle estimations α(b). The panning coefficients of the two channels $(P_R, P_L)$ are computed as $$P_R = \sqrt{\frac{\sin\left(-\frac{\alpha(b)}{360}2\pi\right)+1}{2}},$$

$$P_L = \sqrt{1-P_R^2},$$

where α(b) angle sign is changed. In situations where the angle estimation of band b is uncertain, the coefficients are given the default value of $P_R=P_L=1/\sqrt{2}$.

In some embodiments a mono output can be formed from the stereo signal as $$C(z)=R(z)/2+L(z)/2.$$

This can be defined as being a focused mono signal, where the amplified and dampened directions and sound sources are still audible, although no directional information is passed to the user.

The audio processor 103 can therefore in some embodiments generate a processed audio signal which can be passed to the spatial audio output 105.

The operation of audio signal processing based on at least the UI input/tracking is shown in FIG. 3 by step 207.

In some embodiments the spatial audio output 105 is configured to output the processed audio signals to a suitable playback apparatus or to memory or any suitable storage element. The output or playback audio can in some embodiments be at least one of: a mono, a stereo, a binaural, multi-channel, spatial or 3D audio signal.

Furthermore it would be understood that the processing of the audio signals (or the outcome of such sound manipulation based on the user input) can be output to a suitable playback apparatus where such playback audio can be used to generate a mono or multi-channel audio playback to the user. In some embodiments the suitable playback apparatus can be coupled to the apparatus via an audio connector or in some embodiments be at least one internal speaker of the apparatus.

Furthermore the processed audio signal (the sound manipulation) and/or adjusted settings based on the user input can be saved or stored (for example in an internal memory, database or cloud) either alone or with the visual data.

The operation of providing an output for the processed audio signals is shown in FIG. 3 by step 209.

In some embodiments the apparatus comprises a visual processor 107. The visual processor 107 can in some embodiments be configured to receive image data from the camera 51 and furthermore user interface input/selection tracking information from the tracker 106. The visual processor 107 can in some embodiments be configured to generate a user interface overlay displayed over the visual image from the camera 51 based on the user interface/tracked selection (audio sources). For example in some embodiments the visual processor 107 can be configured to highlight the selection region or area and as the tracker 106 follows the (audio source) selection the visual processor can be configured to generate an overlay which can highlight this motion. Furthermore in some embodiments the visual processor 107 can be configured to provide a user interface visual indication when the selection (audio source) leaves the field of view, in other words moves out of vision of the camera, so that the user can in some embodiments re-orientate the apparatus to follow the audio source.

In such embodiments the visual processor or suitable visual processing means can be configured to generate a display image comprising at least one visual image element from an image frame within a region of the display. Further the display can in such embodiments be configured to display the display image on a touch interface display configured to provide at least one selection input, wherein determining a point of interest location of the at least one visual element can be provided by determining the at least one point of interest location based on the at least one selection input.

The visual processor 107 can output this visual user interface overlay to the display 52 along with the camera image data.

In other words in some embodiments the embodiments as described herein generate the display image by: capturing (by suitable means) at least one image frame; generating (by suitable means) at least one user interface overlay element; and combining (by suitable means) the at least one image frame and the at least one user interface overlay element to generate the display image comprising the at least one visual element.

The overlay as described herein can be any of the following: an overlay displaying the point of interest location of the at least one acoustic source; an overlay highlighting the at least one point of interest location associated with the at least one acoustic source is out of field of view of the image frame; a focus region overlay displaying a processing focus range and direction based on the at least one point of interest location associated with the at least one acoustic source; a processing overlay configured to display the toggle state for generating at least one further at least one user interface overlay element; a focus amplification overlay configured to display at least one amplification gain for reproducing the at least one audio signal from at least one sound playback transducer based on the determined trajectory; a focus attenuation overlay configured to display at least one attenuation dampening for reproducing the at least one audio signal from at least one sound playback transducer based on the determined trajectory; a focus inverter overlay configured to display a toggle state for inverting a focus operation; and a focus amplification profile overlay configured to display an amplification profile for directions surrounding the apparatus.

The operation of generating a video/image data based on the user interface input/tracking is shown in FIG. 3 by step 208.

The display 52 can be configured to receive the data from the visual processor 107 and display the generated/processed images.

The operation of displaying the generated/processed images is shown in FIG. 3 by step 210.

Figure 4:
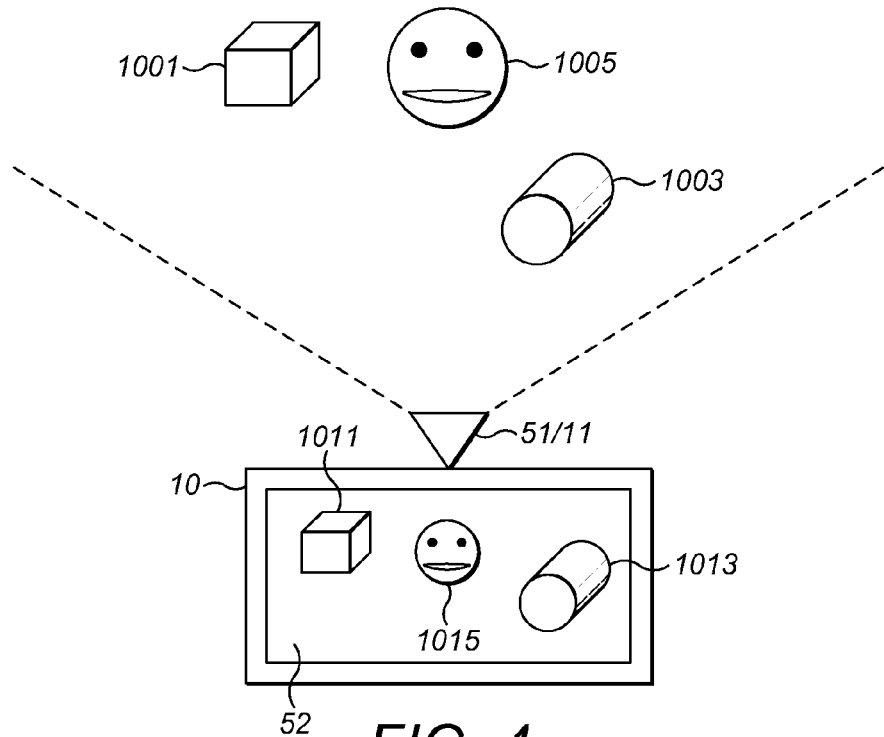
FIG. 4 shows an example audio-video capture scenario.

With respect to FIG. 4 an example apparatus 10 in operation according to some embodiments is shown. In the example shown in FIG. 11 the apparatus 10 comprising the display 52 and camera 51 shows a camera vision range shown by the dotted lines following the initialisation of an application or program where video/audio capture is performed. Within the view of the camera are shown a first audio source 1001, a second audio source 1003 and a third audio source 1005. These audio sources are represented visually on the display 52 by a first audio source visual representation 1011, a second audio source visual representation 1013, and a third audio source visual representation 1015.

Figure 5:
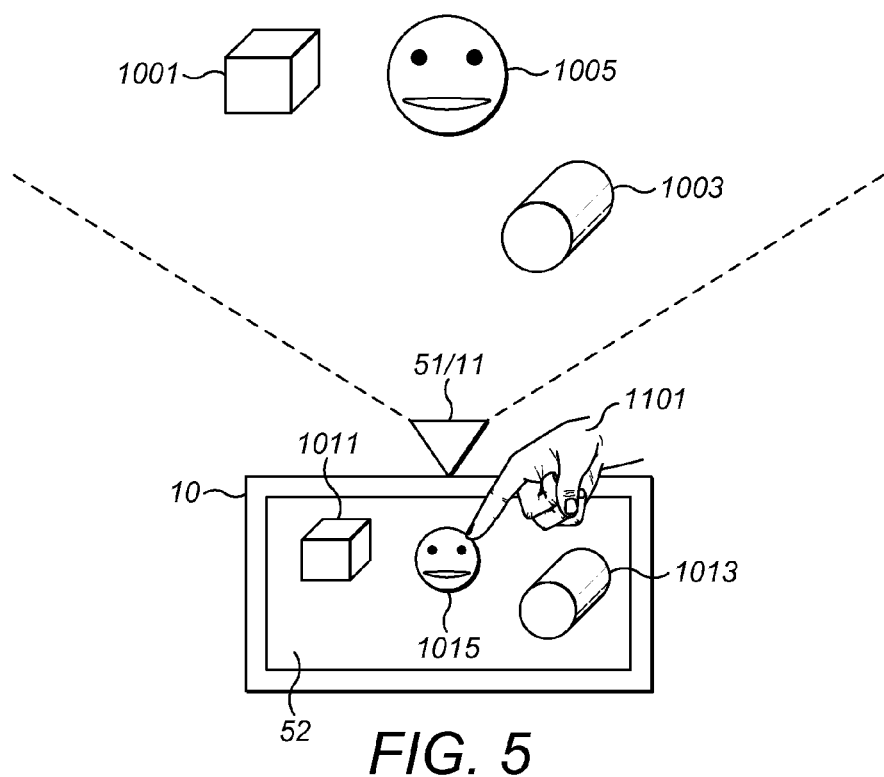
FIG. 5 shows the example audio-video capture scenario with user input to identify a focused audio-visual source.

With respect to FIG. 5 the example shown in FIG. 4 is shown as the user 1101 indicates, by tapping the display at the point of the third audio source visual representation 1015, that the third audio source 1015 is the selection, in other words that the third audio source is to be tracked and processed. In other words the apparatus touch/user interface controller 104 can be configured to receive an input from the display 52 indicating a position or location of a selection which can then be passed to a tracker 106. It would be understood that in some embodiments the apparatus display or other user interface input can be configured to determine whether the focus is to be a positive focus, and to enhance or amplify the third audio source relative to the other audio sources or a negative focus and to diminish or attenuate the third audio source relative to the other audio sources. For example the display can display specific amplify/attenuate icons, or comprise a user interface slider, or dial which can be used to specify the degree of focus attenuation/amplification to be applied to the focus or selection region.

Figure 6:
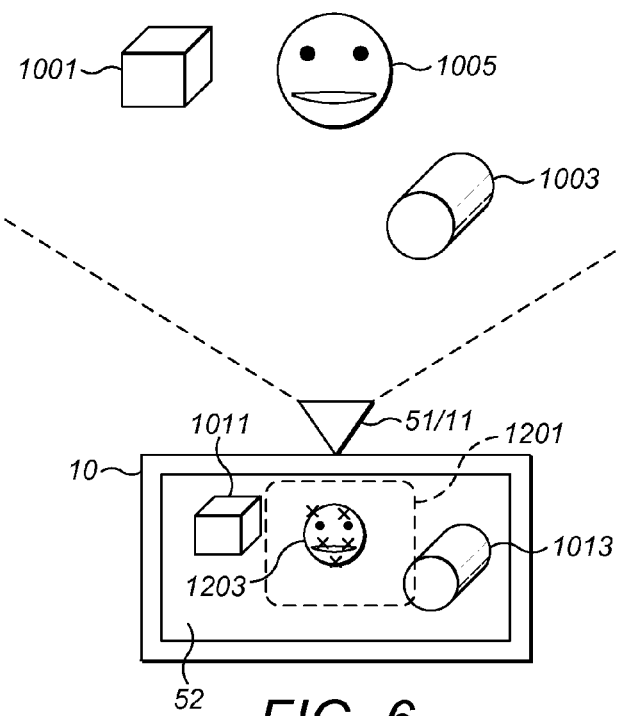
FIG. 6 shows the example audio-video capture scenario showing a visually identified focused audio-visual source.

With respect to FIG. 6 the apparatus is shown following the selection of the third audio source as the audio source to be focussed. In the example shown in FIG. 6 in some embodiments the tracker 106 feature selector has generated suitable visual descriptor (and/or audio fingerprint or descriptor) elements associated with the third audio source 1005 and passed these to highlight the third audio source visual representation 1015 displayed on the screen. For example in some embodiments the visual descriptor is displayed on the display as at least one visual descriptor feature 1203 shown in FIG. 6 by the crosses. In some embodiments the highlighting of the audio source visual representation can employ a box 1201 surrounding the third audio source visual representation.

Figure 7:
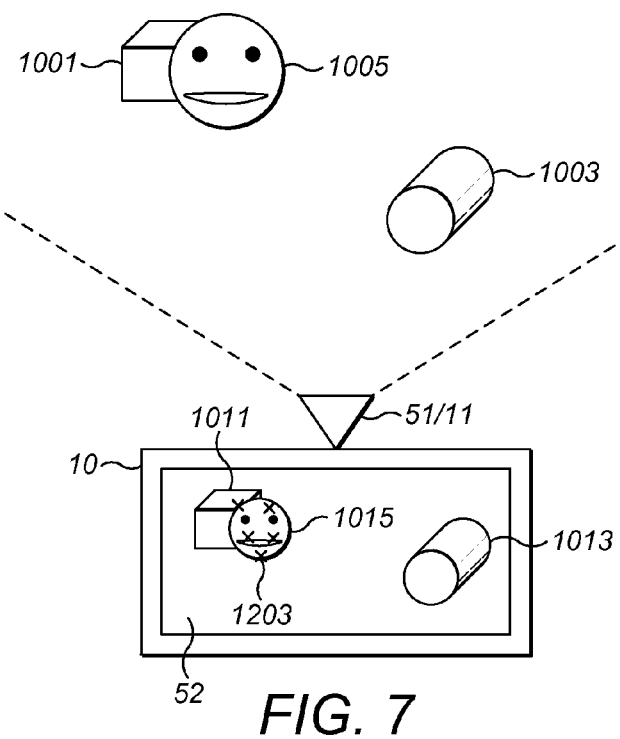
FIG. 7 shows the example audio-video capture scenario showing a visually identified focused audio-visual source being tracked.

With respect to FIG. 7 the apparatus is shown following the movement of the third audio source 1005. In this example the third audio source 1005 has moved relative to the first audio source 1001 and the second audio source 1003 to pass in front of the first audio source 1001. This is shown in FIG. 7 on the display 52 of the apparatus 10 as the third audio source visual representation 1015 moves across and in front of the first audio source visual representation 1011 but where the visual descriptor elements 1203 are shown having tracked the third audio source visual representation.

Figure 8:
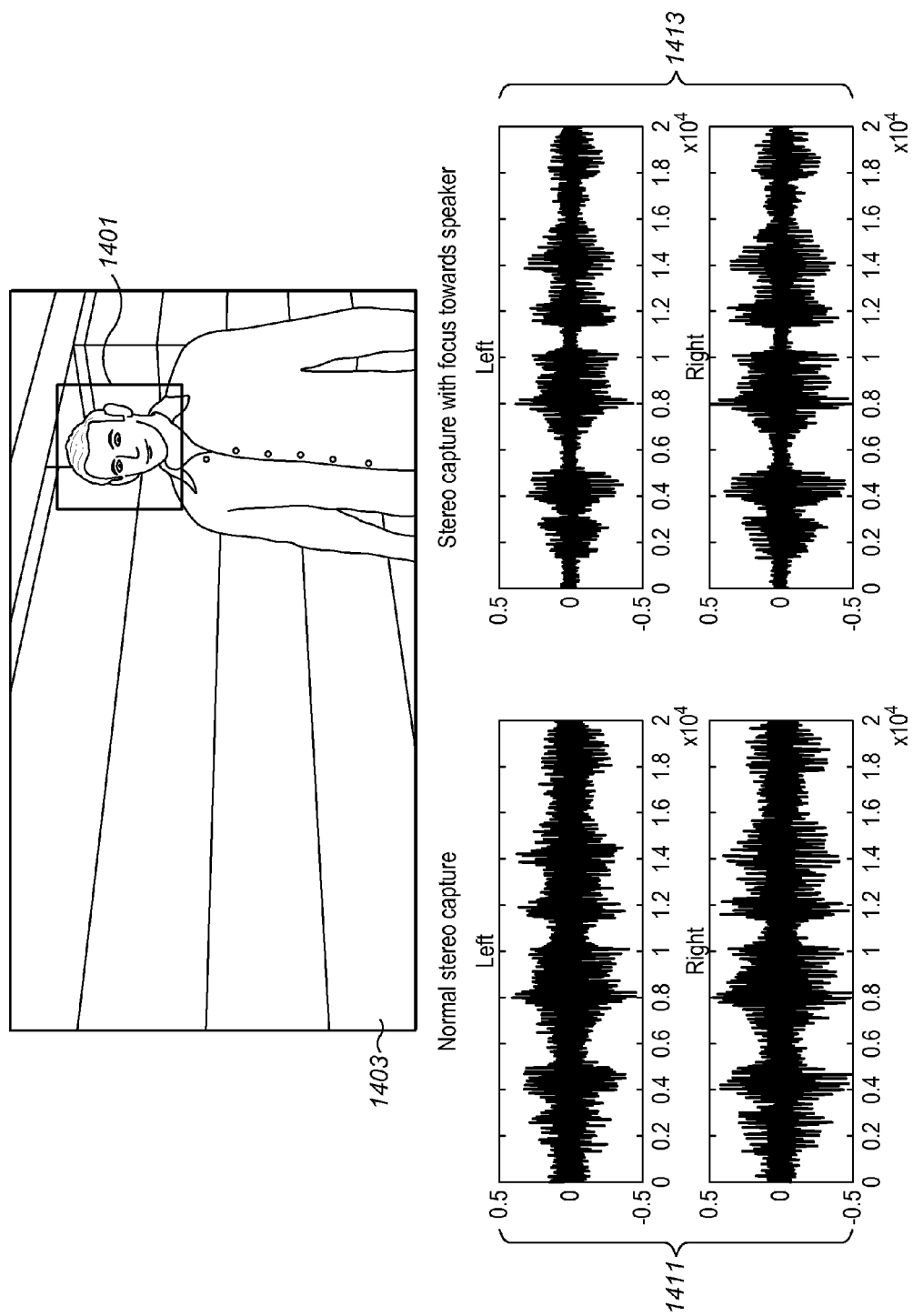
FIG. 8 shows an example audio-video capture scenario showing an visually identified focussed audio-visual source and example audio waveforms showing focussed and unfocussed audio capture.

With respect to FIG. 8 an example visual image showing a selection (audio source) is shown wherein the image 1403 comprises a first audio source, a speaker or person speaker shown by the highlighted selection box 1401. Furthermore FIG. 8 shows the difference between a normal stereo capture audio signal 1411 and the focused stereo capture audio signal 1413 where the apparatus has applied a focus towards the speaker.

Figure 9:
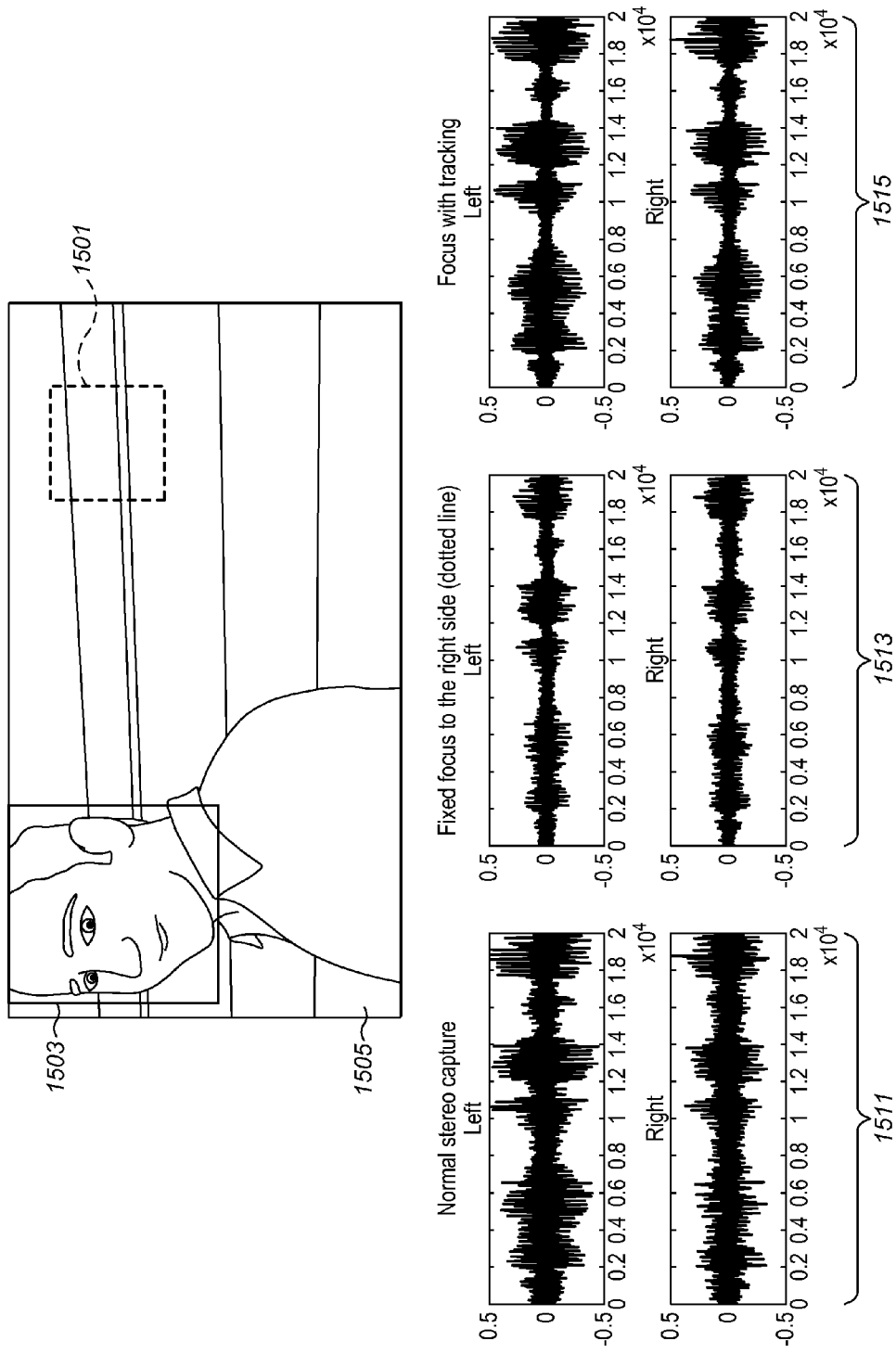
FIG. 9 shows the example audio-video capture scenario showing an visually identified focussed audio-visual source and example audio waveforms showing tracked focussed, untracked focus and unfocussed audio capture.

With respect to FIG. 9 a further example is shown where the speaker is tracked. The image 1505 shows the position of the original selection (or audio source speaker) 1501 and of the audio source or speaker having moved and being highlighted by box 1503. The figure further shows the unfocused stereo capture audio signals 1511, a fixed focused audio signal 1513 based on the original selection area 1501, and the tracked focussed audio signal 1515 based on tracking the audio source from the original selection area 1501 to the current tracked area 1503.

Figure 10:
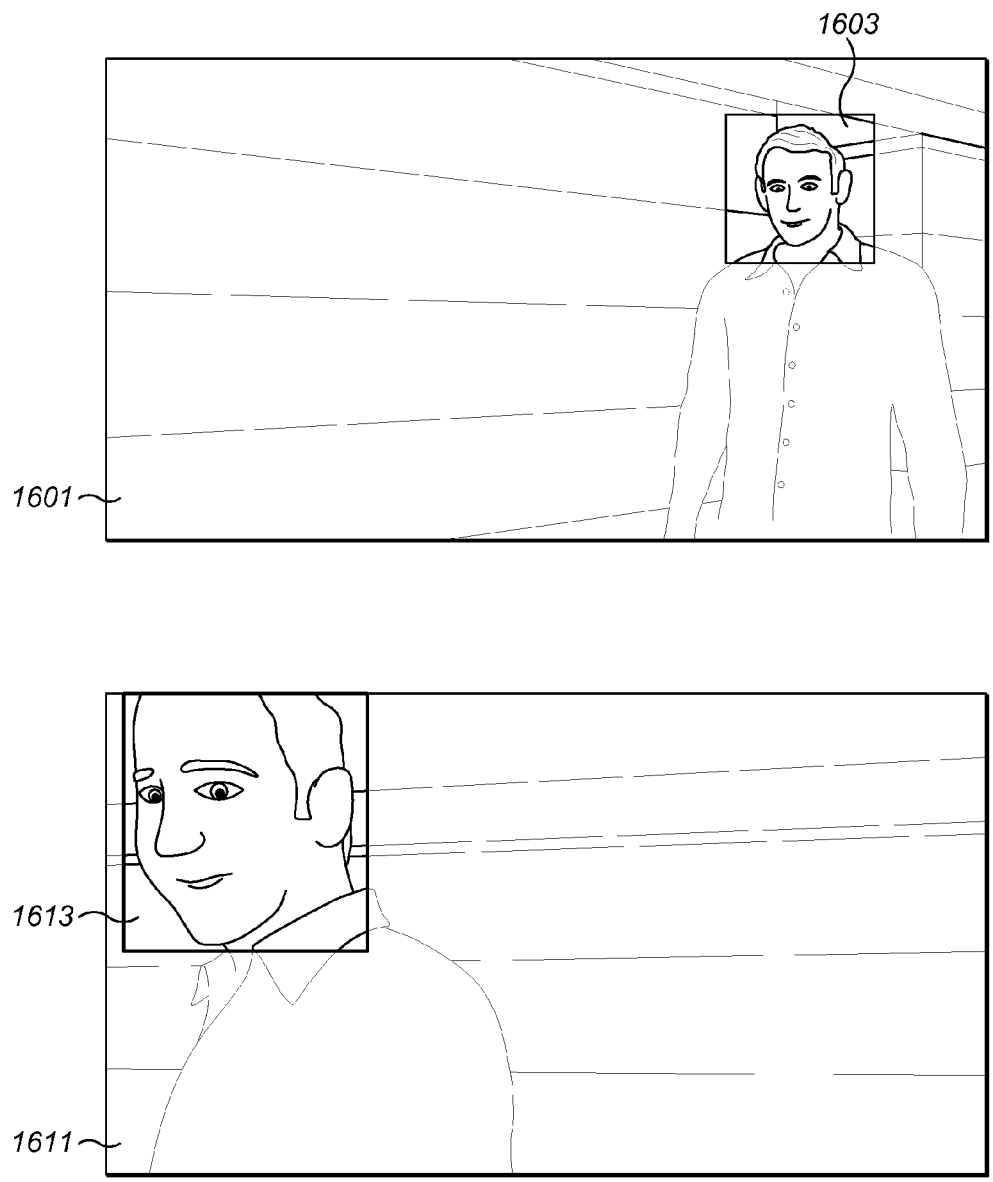
FIG. 10 shows the example audio-video capture scenario showing video processing to visually identify the audio-visual source in focus.

With respect to FIG. 10 example visual processor user interface overlays showing tracking are shown wherein the first image 1601, which is based on the image 1403 of FIG. 8, is shown where the visual processor has applied a masking overlay such that the focused region is brighter than the unfocused regions. In some embodiments this can be performed by applying a lightening of the pixels in the focus area or region or by applying a darkening of the pixels outside of the focus area or region or both. Thus the focused region 1603 can be seen clearly where the unfocused regions are dark. Furthermore FIG. 10 shows how the masking tracks the selection such that the second image 1611, based on the image 1505 of FIG. 9 shows a similar darkening of the non-focused regions.

It would be understood that the visual processor 107 can generate any suitable overlay image processing to show the focusing of the selection region or area. These can include brightening of the image, changing the image colours or sharpening or blurring the image where the image is in focus or out of the focus region.

Figure 11:
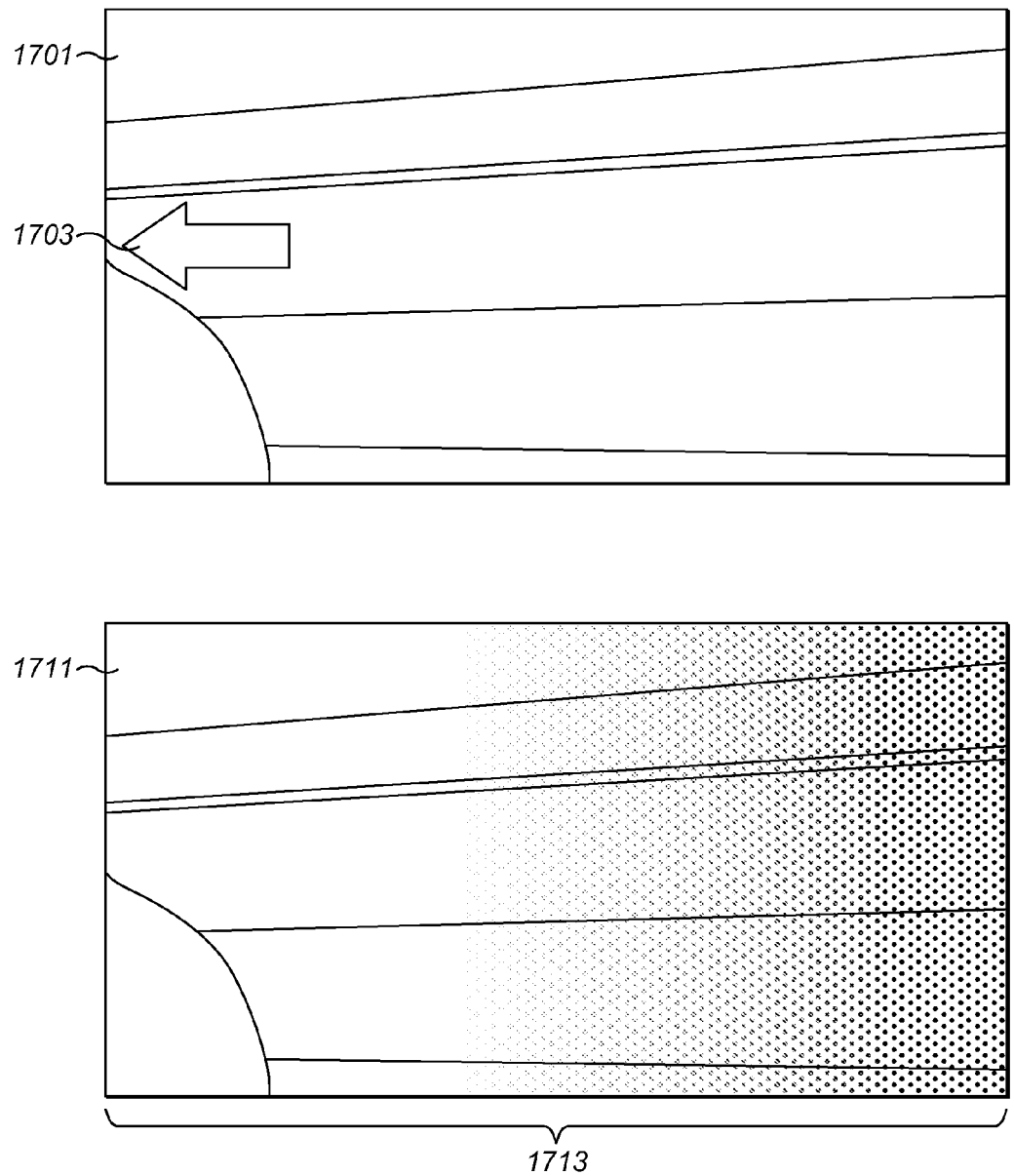
FIG. 11 shows the example audio-video capture scenario showing video processing to visually identify where the audio-visual source in focus is off screen.

With respect to FIG. 11 example visual processor user interface overlays are shown where the selection feature (audio source) is out of the field of view of the camera. Thus in both of the images 1701, 1711 shows the audio source, the speaker, has moved out of view of the camera. The first image 1701 shows a user interface overlay arrow 1703 pointing in the direction that the audio source has moved out of the field of view of the camera. The second image 1711 shows where the visual processor 107 has applied a masking function to graduate a darkening away from the selection (or in other words graduate a lightening of the image towards the out of view selection) such that the image is lightest towards the edge that the audio source or selection has moved out of the field of view.

Figure 12:
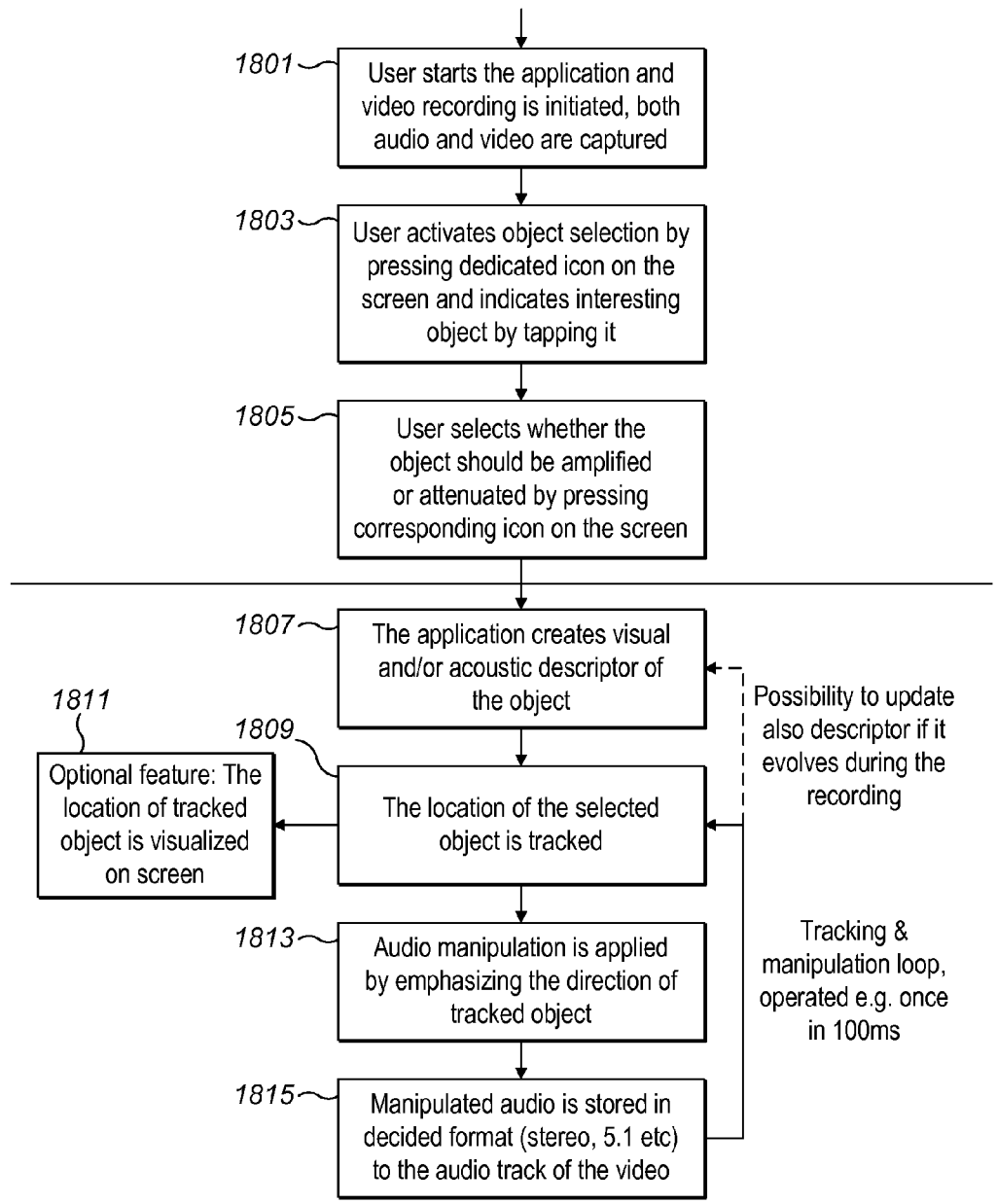
FIG. 12 shows a flow diagram of the overview operation of the apparatus according to some embodiments.

With respect to FIG. 12 an example flowchart shows an example operation of the apparatus according to some embodiments.

In some embodiments the user starts the application or suitable program on the apparatus and video recording is initiated. In this example both the audio and video are captured.

The operation of the initialising or starting of the audio and video recording is shown in FIG. 12 by step 1801.

When the user wishes to select a suitable object to focus on the user can in some embodiments then activate an object selection by pressing a dedicated icon on the screen and indicating an interesting object by selecting 'tapping' it.

The operation of activating the object selection by pressing a dedicated icon on the screen and indicating an interesting object by tapping is shown in FIG. 12 by step 1803.

In some embodiments the user can further provide a user input indicating whether the object should be amplified or attenuated by pressing a corresponding icon on the screen.

In general in some embodiments the user can provide a suitable control input associated with the at least one point of interest location associated with the at least one acoustic source and which is employed by the audio processor such that reproducing the at least one audio signal from at least one sound playback transducer based on the determined trajectory causes the apparatus to reproduce the at least one audio signal based on the at least one control input.

The control input for example could be any of the following: a processing width for controlling the reproducing the at least one audio signal from at least one sound playback transducer; a processing range for controlling the reproducing the at least one audio signal from at least one sound playback transducer; a focus amplification factor for controlling reproducing the at least one audio signal from at least one sound playback transducer; a focus attenuation factor for controlling the reproducing the at least one audio signal from at least one sound playback transducer; an out of focus amplification factor for controlling the reproducing the at least one audio signal from at least one sound playback transducer; and an out of focus attenuation for controlling the reproducing the at least one audio signal from at least one sound playback transducer.

The operation of selecting whether the object should be amplified or attenuated by pressing a corresponding icon on the screen is shown in FIG. 12 by step 1805.

It would be understood that in some embodiments the object selection and/or the determination of whether the application or attenuation of the focused object can be determined automatically in some embodiments.

In some embodiments the apparatus application can create the visual and/or acoustic descriptor of the object.

The operation of creating the visual and/or acoustic description of the object is shown in FIG. 12 by step 1807.

The apparatus application can then in some embodiments track the location of the selected object based on the visual and/or acoustic descriptor of the object.

The operation of the tracking the location of the selected object is shown in FIG. 12 by 1809.

In some embodiments, in other words as an optional feature, the location of the tracked object is visualised on the screen. For example as described herein the visual processor generates a suitable masking or highlighting effect based on the location of the tracked object which can be presented with the physical image of the object from the camera image.

The operation of visualising the object on the screen is shown in FIG. 12 by step 1811.

Furthermore in some embodiments audio processing or manipulation is applied by emphasising the direction of the tracked object.

The operation of the audio manipulation of the tracked objects is shown in

FIG. 12 by step 1813.

In some embodiments the processed audio is then stored in a determined format as at least one audio track of the video.

The operation of the storing of the manipulated audio as at least one audio track of the video is shown in FIG. 12 by step 1815.

This application or operation can then as described herein return back to either operation of updating of the descriptor or the operation of tracking the object.

For example the object can in some embodiments be tracked once every 100 ms. The operation of updating of the descriptor values can in some embodiments occur every 2-300 ms (in other words less often than the tracking or in some embodiments at the same frequency as the tracking) or in some embodiments the updating of the descriptor values can occur where the tracked descriptor values change significantly from the previously stored descriptor values.

In the description herein the components can be considered to be implementable in some embodiments at least partially as code or routines operating within at least one processor and stored in at least one memory.

It shall be appreciated that the term user equipment is intended to cover any suitable type of wireless user equipment, such as mobile telephones, portable data processing devices or portable web browsers.

Furthermore elements of a public land mobile network (PLMN) may also comprise apparatus as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising at least one processor and at least one memory including computer code for one or more programs, the at least one memory and the computer code configured to, with the at least one processor, cause the apparatus to:
    determine, using at least one audio signal, at least one acoustic source;
    determine at least one point of interest associated with the at least one acoustic source, where the at least one point of interest is determined, at least in part, by a user interface indication of at least one point of interest location;
    determine a trajectory of the at least one acoustic source, where the trajectory of the at least one acoustic source is determined based, at least partially, upon the user interface indication of the at least one point of interest location and locational movement of the at least one acoustic source;
    determine a spatial audio signal based at least partially from the at least one acoustic source and including directional information of the trajectory of the at least one acoustic source; and
    cause the spatial audio signal to be at least partially played from at least one sound playback transducer, wherein the spatial audio signal is caused to be at least partially played from the at least one sound playback transducer based at least partially on the directional information of the trajectory of the at least one acoustic source.

2. The apparatus as claimed in claim 1, wherein the at least one acoustic source is determined by causing the apparatus to:
    determine at least one metafile associated with the at least one audio signal, wherein the at least one metafile comprises acoustic source location information; and
    determine from the acoustic source location information the at least one acoustic source so as to determine the at least one point of interest location associated with the at least one acoustic source.

3. The apparatus as claimed in claim 1, wherein the at least one point of interest is determined by causing the apparatus to at least one of:
    determine the at least one point of interest location by determining at least one location associated with a visual image element from an image frame;
    determine the at least one point of interest location by determining at least one location associated with the at least one audio signal; and
    determine the at least one point of interest location by determining at least one user input location of the user interface indication.

4. The apparatus as claimed in claim 1, where the apparatus is further configured to:
    provide at least one visual image element, within a region of a display, of the at least one acoustic source; and
    determine the at least one point of interest location based on the at least one visual image element, wherein the at least one acoustic source is defined as being the at least one point of interest location associated with the at least one visual image element.

5. The apparatus as claimed in claim 4, wherein the apparatus is configured to provide the at least one visual image element comprising:
    generate a display image comprising the at least one visual image element from an image frame within the region of the display; and
    display the display image on a touch interface display portion of the display configured to provide at least one selection input as the user interface indication so as to determine the at least one point of interest location based on the at least one selection input.

6. The apparatus as claimed in claim 5, wherein the apparatus is configured to generate the display image comprising:
    capture the at least one image frame;
    generate at least one user interface overlay element; and
    combine the at least one image frame and the at least one user interface overlay element to generate the display image.

7. The apparatus as claimed in claim 6, wherein the apparatus is configured to generate at least one user interface overlay element comprising:
    generate an overlay displaying the point of interest location of the at least one acoustic source;
    generate an overlay highlighting the at least one point of interest location is out of field of view of the image frame;
    generate a focus region overlay displaying a processing focus range and direction based on the at least one point of interest location;
    generate a processing overlay configured to display a toggle state;
    generate a focus amplification overlay configured to display at least one amplification gain for playing the at least one audio signal from at least one sound playback transducer based on the determined trajectory;
    generate a focus attenuation overlay configured to display at least one attenuation for playing the at least one audio signal from at least one sound playback transducer based on the determined trajectory;
    generate a focus inverter overlay configured to display a toggle state for inverting a focus operation; and
    generate a focus amplification profile overlay configured to display an amplification profile for directions surrounding the apparatus.

8. The apparatus as claimed in claim 1, where the apparatus is configured to provide at least one control input associated with the at least one point of interest location, and based on the at least one control input, cause the at least one audio signal to be played from the at least one sound playback transducer.

9. The apparatus as claimed in claim 8, wherein the apparatus is configured to provide the at least one control input comprising providing at least one of:
   a processing width to control the playing of the at least one audio signal from at least one sound playback transducer;
   a processing range to control the playing of the at least one audio signal from at least one sound playback transducer;
   a focus amplification factor to control the playing of the at least one audio signal from at least one sound playback transducer;
   a focus attenuation factor to control the playing of the at least one audio signal from at least one sound playback transducer;
   an out of focus amplification factor to control the playing of the at least one audio signal from at least one sound playback transducer; and
   an out of focus attenuation to control the playing of the at least one audio signal from at least one sound playback transducer.

10. The apparatus as claimed in claim 1, wherein the at least one audio signal comprises at least two audio signals, and where the apparatus is configured to determine the at least one acoustic source by the at least two audio signals and the determined at least one acoustic source comprising a location value which is within the at least one point of interest location.

11. The apparatus as claimed in claim 1, wherein the apparatus is configured to determine the trajectory of the at least one point of interest location comprising:
   determine at least one feature associated with at least one visual image element and/or the at least one acoustic source at the at least one point of interest location;
   track the at least one feature associated with the at least one visual image element and/or the at least one acoustic source; and
   determine trajectory of the at least one feature.

12. The apparatus as claimed in claim 1, where the apparatus is configured to receive the at least one audio signal from one of:
   at least two microphones;
   an apparatus memory; and
   at least one further apparatus.

13. The apparatus as claimed in claim 1, wherein the apparatus is configured to receive at least one captured image frame from which the at least one point of interest location, and receive the at least one captured image frame from at least one of: at least one camera; a memory; and at least one further apparatus.

14. The apparatus as claimed in claim 1 where the user interface indication of the at least one point of interest location comprises a visual indication of the at least one acoustic source.

15. The apparatus as claimed in claim 14 where the trajectory of the at least one acoustic source is based, at least partially, upon movement of the user interface indication of the at least one point of interest location during the locational movement of the at least one acoustic source, where the spatial audio signal is determined to acoustically focus on the at least one acoustic source which has been indicated by the user interface indication, and where, during the playing, the at least one acoustic source is acoustically focused and at least one other acoustic source that is outside of the determined at least one point of interest location is acoustically dampened.

16. The apparatus as claimed in claim 1 where the trajectory of the at least one acoustic source is based, at least partially, upon movement of the user interface indication of the at least one point of interest location during the locational movement of the at least one acoustic source.

17. The apparatus as claimed in claim 1 where the spatial audio signal is determined to acoustically focus on the at least one acoustic source which has been indicated by the user interface indication.

18. The apparatus as claimed in claim 1 where, during the playing, the at least one acoustic source is acoustically focused and at least one other acoustic source that is outside of the determined at least one point of interest location is acoustically dampened.

19. A method comprising:
   determining, using at least one audio signal, at least one acoustic source;
   determining at least one point of interest location associated with the at least one acoustic source, where the at least one point of interest is determined, at least in part, by a user interface indication of at least one point of interest location;
   determining a trajectory of the at least one acoustic source, where the trajectory of the at least one acoustic source is determined based, at least partially, upon the user interface indication of the at least one point of interest location and locational movement of the at least one acoustic source;
   determining a spatial audio signal based at least partially from the at least one acoustic source and including directional information of the trajectory of the at least one acoustic source; and
   causing the spatial audio signal to be at least partially played from at least one sound playback transducer, wherein the spatial audio signal is caused to be at least partially played from the least one sound playback transducer based at least partially on the directional information of the trajectory of the at least one acoustic source.

20. The method as claimed in claim 19, wherein the determining, using at least one audio signal, of the at least one acoustic source comprises at least one of:
   determining at least one metafile associated with the at least one audio signal, the at least one metafile comprising acoustic source location information; and
   determining from the acoustic source location information the at least one acoustic source for determining the at least one point of interest location associated with the at least one acoustic source.

21. The method as claimed in claim 19, wherein the determining of the at least one point of interest associated with the at least one acoustic source comprises at least one of:
   determining the at least one point of interest by determining at least one location associated with a visual image element from an image frame;
   determining the at least one point of interest by determining at least one location associated with at least one audio signal; and
   determining the at least one point of interest by determining at least one user input location including the user interface indication.

22. The method as claimed in claim 19, wherein the method further comprising: providing at least one visual image element;
   generating a display image comprising the at least one visual image element from an image frame within the region of the display;
   displaying the display image on a touch interface display for providing at least one selection input; and
   determining the at least one point of interest based on the at least one selection input including the user interface indication.

23. The method as claimed in claim 19, wherein the determining of the trajectory of the at least one point of interest comprises:
   determining at least one feature associated with at least one visual image element and/or the at least one acoustic source at the at least one point of interest;
   tracking the at least one feature associated with the at least one visual image element and/or the at least one acoustic source; and
   determining trajectory of the at least one feature.

24. The method as claimed in claim 19, further comprising:
   providing at least one control input associated with the at least one point of interest; and
   playing the at least one audio signal from at least one sound playback transducer based on the at least one control input.

25. The method as claimed in claim 19 where the user interface indication of the at least one point of interest location comprises a visual indication of the at least one acoustic source, where the trajectory of the at least one acoustic source is determined based, at least partially, upon movement of the user interface indication of the at least one point of interest location during the locational movement of the at least one acoustic source, where the spatial audio signal is determined to acoustically focus on the at least one acoustic source which has been indicated by the user interface indication, and where, during the playing, the at least one acoustic source is acoustically focused and at least one other acoustic source which is outside of the determined at least one point of interest location is acoustically dampened.

26. An apparatus comprising:
   a spatial audio analyser configured to determine, using at least one audio signal, at least one acoustic source;
   a location determiner configured to determine at least one point of interest associated with the at least one acoustic source, where the at least one point of interest is determined, at least in part, by a user interface indication of at least one point of interest location;
   a trajectory determiner configured to determine a trajectory of the at least one acoustic source, where the trajectory of the at least one acoustic source is determined based, at least partially, upon the user interface indication of the at least one point of interest location and movement of the at least one acoustic source;
   where the spatial audio analyser is configured to provide a spatial audio signal base at least partially from the at least one acoustic source and including directional information of the trajectory of the at least one acoustic source; and
   circuitry configured to cause the spatial audio signal to be at least partially played from at least one sound playback transducer, wherein spatial audio signal is caused to be at least partially played from the at least one sound playback transducer based at least partially on the directional information of the trajectory of the at least one acoustic source.

UNITED STATES PATENT AND TRADEMARK OFFICE
CERTIFICATE OF CORRECTION

PATENT NO. : 10,142,759 B2
APPLICATION NO. : 14/326465
DATED : November 27, 2018
INVENTOR(S) : Kemal Ugur and Mikko Tapio Tammi Page 1 of 1

It is certified that error appears in the above-identified patent and that said Letters Patent is hereby corrected as shown below:

In the Claims

In Claim 19:
Column 40, Line 21, "location" should be deleted.

In Claim 26:
Column 42, Line 23, "base" should be deleted and --based-- should be inserted.

In Claim 26:
Column 42, Line 29, "wherein" should be deleted and --wherein the-- should be inserted.

Signed and Sealed this
Twenty-ninth Day of January, 2019

Andrei Iancu
*Director of the United States Patent and Trademark Office*